United States Patent [19]
Thompson et al.

[11] Patent Number: 5,825,923
[45] Date of Patent: Oct. 20, 1998

[54] METHOD FOR PERFORMING CHARACTER RECOGNITION ON A PIXEL MATRIX

[75] Inventors: Archie L. Thompson, San Jose; Richard A. Van Saun, Menlo Park, both of Calif.

[73] Assignee: Faxtrieve, Inc., Mountain View, Calif.

[21] Appl. No.: 706,577

[22] Filed: Sep. 5, 1996

[51] Int. Cl.[6] .............................. G06K 9/42; G06K 9/44; G06K 9/62; G06K 9/80
[52] U.S. Cl. .................... 382/204; 382/205; 382/218; 382/258; 382/264; 382/298
[58] Field of Search .................................. 382/258, 203, 382/204, 205, 256, 257, 187, 190, 217, 218, 264, 298, 276, 253

[56] References Cited

U.S. PATENT DOCUMENTS

| | | | |
|---|---|---|---|
| 4,048,615 | 9/1977 | Chuang et al. | 382/196 |
| 4,132,976 | 1/1979 | Siegal | 382/184 |
| 4,491,960 | 1/1985 | Brown | 382/204 |
| 4,891,750 | 1/1990 | Pastor | 382/197 |
| 4,987,603 | 1/1991 | Ohnishi et al. | 382/203 |
| 5,113,452 | 5/1992 | Chatani et al. | 382/187 |
| 5,113,453 | 5/1992 | Simon | 382/202 |
| 5,133,026 | 7/1992 | Fujiwara et al. | 382/161 |
| 5,151,950 | 9/1992 | Hullender | 382/187 |
| 5,214,717 | 5/1993 | Kimura et al. | 382/202 |
| 5,235,650 | 8/1993 | Jeong | 382/158 |
| 5,239,592 | 8/1993 | Kameyama et al. | 382/138 |
| 5,267,332 | 11/1993 | Walch et al. | 382/198 |
| 5,307,424 | 4/1994 | Kuehl | 382/198 |
| 5,319,721 | 6/1994 | Chefalas et al. | 382/160 |
| 5,325,447 | 6/1994 | Vogt, III | 382/102 |
| 5,438,631 | 8/1995 | Dai | 382/197 |
| 5,454,046 | 9/1995 | Carman, II | 382/186 |
| 5,459,796 | 10/1995 | Boyer | 382/187 |
| 5,467,407 | 11/1995 | Guberman et al. | 382/186 |
| 5,479,533 | 12/1995 | Tanaka | 382/161 |
| 5,515,455 | 5/1996 | Govindaraju et al. | 382/186 |
| 5,537,484 | 7/1996 | Kobayashi | 382/124 |
| 5,537,489 | 7/1996 | Sinden et al. | 382/187 |
| 5,633,954 | 5/1997 | Gupta et al. | 382/187 |

*Primary Examiner*—Jon Chang
*Attorney, Agent, or Firm*—Townsend and Townsend and Crew LLP; Kenneth R. Allen

[57] ABSTRACT

Pattern recognition, particularly character recognition, is effected by categorizing a cipher by a unique description using three feature sets identifying the type and location of lines which form the cipher, the location of the endpoints of each of the lines, and the location of the intersections of the lines. In the process according to the invention, lines are located by expanding or contracting the original image of the cipher to fit into a sparse space pixel matrix. The image is then thinned to define lines and so as not to obliterate lines which give the cipher its uniqueness. Once the cipher is thinned, fuzzy logic is used to "locate", that is, define a set of coordinates for, each line relative to an x-y coordinate system. (As each line is located, it is removed from the matrix image to facilitate locating the remaining lines.) After all the lines are located, the endpoints of each line are located and the intersect points are located. These three feature sets are encoded, resulting in three values, such as 64-bit integers. These three integers are then used as search keys to query a relational database which contains the integer sets for known characters. If a direct match is not found, a matching algorithm uses partial matches to extrapolate the correct character. Because the matrix is sparse, the likelihood of identifying the correct character is enhanced.

24 Claims, 25 Drawing Sheets

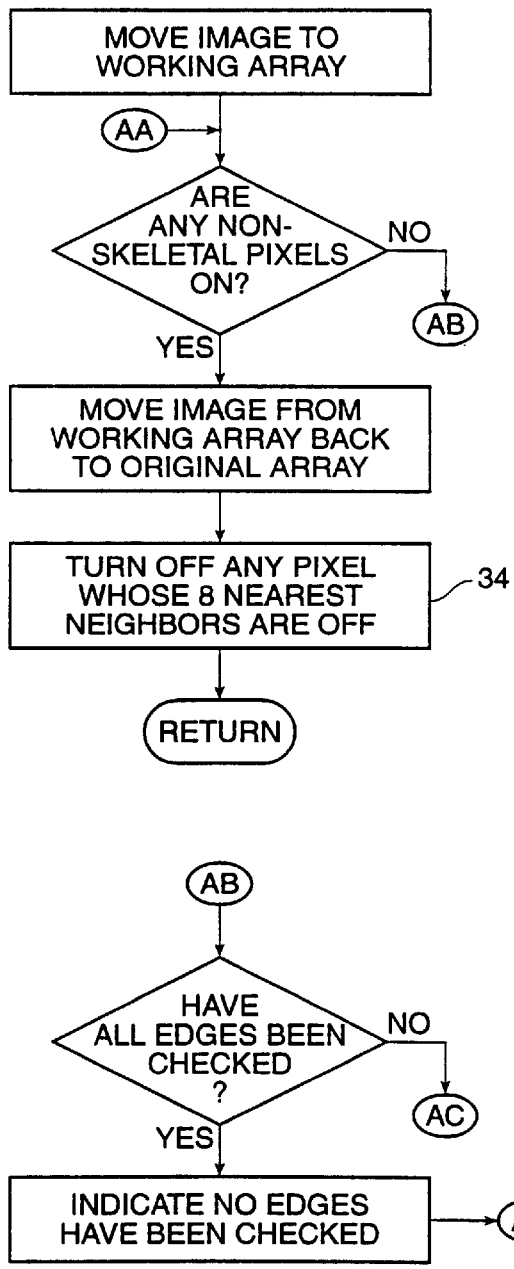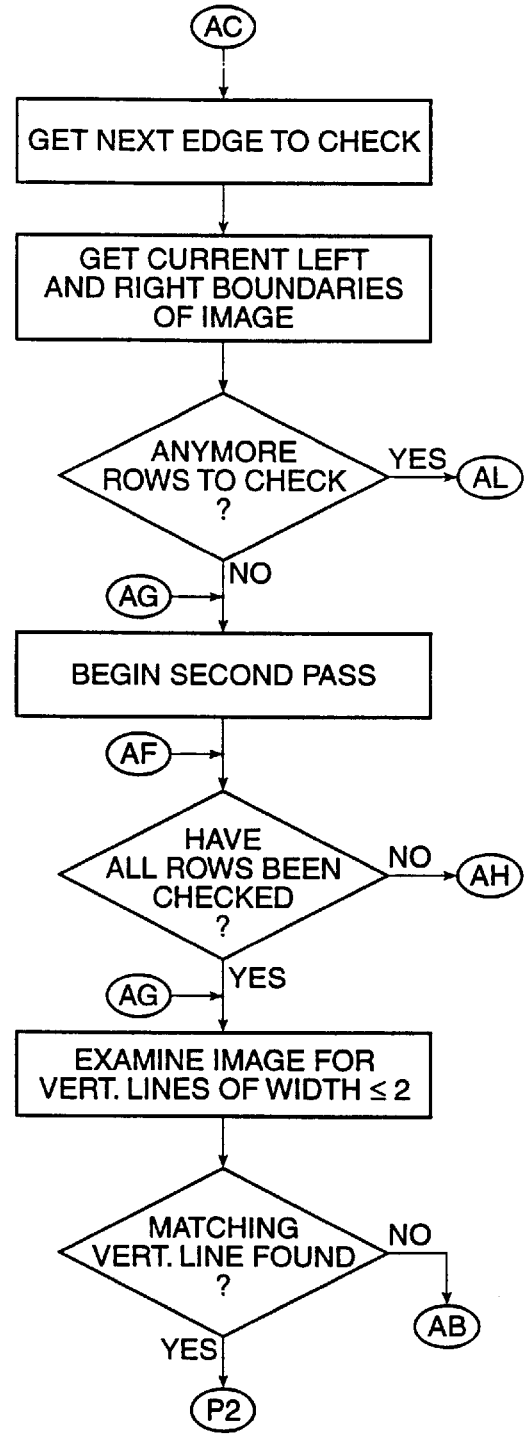
FIG. 2A

```
O O O O O O O
O O N N N O O
O O N P N O O
O O N N N O O
O O O O O O O
```

P = PIXEL IN QUESTION
N = NEIGHBOR PIXEL

P = PIXEL IN QUESTION
N = NEIGHBOR PIXEL

P = PIXEL IN QUESTION
N = NEIGHBOR PIXEL

P = PIXEL IN QUESTION
N = NEIGHBOR PIXEL

P = PIXEL IN QUESTION
N = NEIGHBOR PIXEL

P = PIXEL TO BE TURNED OFF
O = PIXELS THAT ARE OFF
I = PIXELS THAT ARE ON

P = PIXEL TO BE TURNED ON
O = PIXELS THAT ARE OFF
I = PIXELS THAT ARE ON

P = PIXELS TO BE TURNED OFF
O = PIXELS THAT ARE OFF
I = PIXELS THAT ARE ON

P = PIXEL IN QUESTION
O = PIXEL IS OFF
I = PIXEL IS ON
A = 1 PIXEL IN GROUP MUST BE ON
B = 1 PIXEL IS GROUP MUST BE ON
Q = PIXEL IS ON BUT NOT SKELETAL
K = PIXEL IS ON AND SKELETAL
X = 1 PIXEL IN GROUP MUST BE OFF

*FIG. 18*

```
0 0 0 0 0 1 0        0 0 0 0 0 0 0
1 1 0 1 1 0 1        1 1 1 1 1 1 1
0 0 1 0 0 0 0        0 0 0 0 0 0 0
   BEFORE               AFTER
```

*FIG. 19*

```
0 1 1 0 0 0 0 1 1 0      0 1 1 1 1 1 1 1 1 0
0 0 0 1 1 1 1 0 0 0      0 0 0 0 0 0 0 0 0 0
       BEFORE                   AFTER
```

*FIG. 20*

SLOPE

| ACTUAL VALUES | ASSIGNED VALUES |
|---|---|
| > 2.50 | .10 |
| ≤ 2.50 | .20 |
| ≤ 2.25 | .30 |
| ≤ 2.00 | .40 |
| ≤ 1.50 | .50 |
| ≤ 1.40 | .60 |
| ≤ 1.30 | .70 |
| ≤ 1.20 | .80 |
| ≤ 1.10 | .90 |
| ≤ 1.00 | 1.00 |

*FIG. 21A*

MAXIMUM DELTA X

| ACTUAL VALUES | ASSIGNED VALUES |
|---|---|
| 0 | 0.00 |
| 1 | .20 |
| 2 | .50 |
| 3 | .70 |
| 4 | .85 |
| ≥5 | 1.00 |

*FIG. 21B*

ZERO SLOPE

| ACTUAL VALUES | ASSIGNED VALUES |
|---|---|
| > .450 | .10 |
| ≤ .450 | .20 |
| ≤ .400 | .30 |
| ≤ .350 | .40 |
| ≤ .300 | .50 |
| ≤ .250 | .60 |
| ≤ .200 | .70 |
| ≤ .150 | .80 |
| ≤ .100 | .90 |
| ≤ .050 | .95 |
| ≤ .025 | 1.00 |

*FIG. 21C*

METHOD FOR PERFORMING CHARACTER RECOGNITION ON A PIXEL MATRIX

BACKGROUND OF THE INVENTION

The present invention relates to pattern and cipher recognition, especially line-based character recognition by offline techniques, particularly where a hand-written character has been digitized and is presented in the form of a sparse space pixel matrix. By sparse matrix, it is meant a matrix having relatively few occupied or non-null cells.

While known systems claim high accuracy in reading hand-written characters of any language, actual use shows these products achieve a much lower accuracy. Attempts have been made to improve accuracy by requiring the writer to write in an unnatural manner that simplifies recognition by computer (e.g. connect the dot schemes and methods where the standard alphabet is modified.)

Another problem of known schemes is the requirement that a character have a minimum resolution of 200 hundred dots per inch when read offline. If the character is being read on-line, algorithms expect characters to be formed with a predetermined sequence of strokes. Known methods are typically character set sensitive, e.g., a method designed to recognize characters of the English alphabet will have a lower accuracy reading Asian ideological characters. Finally, there are known methods which rely on matching words in a post processing dictionary to improve recognition accuracy. Such a method is acceptable for processing text or prose. However, if characters are in fields which do not form words (e.g. part numbers or serial numbers in an order form) the dictionary method is rendered useless.

SUMMARY OF INVENTION

According to the present invention, pattern recognition, particularly character recognition is effected by categorizing a cipher by a unique description using three feature sets identifying the type and location of lines which form the cipher, the location of the endpoints of each of the lines, and the location of the intersections of the lines. In the process according to the invention, lines are located by expanding or contracting the original image of the cipher to fit into a sparse space pixel matrix. The image is then thinned to define lines and so as not to obliterate lines which give the cipher its uniqueness.

Once the cipher is thinned, fuzzy logic is used to "locate", that is, define a set of coordinates for, each line relative to an x-y coordinate system. (As each line is located, it is removed from the matrix image to facilitate locating the remaining lines.) After all the lines are located, the endpoints of each line are located and the intersect points are located. These three feature sets are encoded, resulting in three values, such as 64-bit integers. These three integers are then used as search keys to query a relational database which contains the integer sets for known characters. If a direct match is not found, a matching algorithm uses partial matches to extrapolate the correct character. Because the matrix is sparse, the likelihood of identifying the correct character is enhanced.

The invention will be better understood upon reference to the following detailed description in connection with the accompanying drawings.

BRIEF DESCRIPTION OF THE DRAWINGS

FIGS. 2A, 2B, 2C together are a flow chart of a thinning algorithm.

FIG. 10 is a diagram illustrating the definition of the eight nearest neighbor pixels.

FIG. 11 is a diagram illustrating the definition of the forty-eight nearest neighbor pixels.

FIG. 12 is a diagram illustrating the definition of bottom six nearest neighbor pixels.

FIG. 13 is a diagram illustrating the definition of top six nearest neighbor pixels.

FIG. 14 is a diagram illustrating the definition of twelve nearest neighbor pixels.

FIG. 15 is a diagram illustrating a pixel to be turned off.

FIG. 16 is a diagram illustrating a pixel at a top gap closure.

FIG. 17 is a diagram illustrating an extraneous top row.

Figures 18, 19, 20:
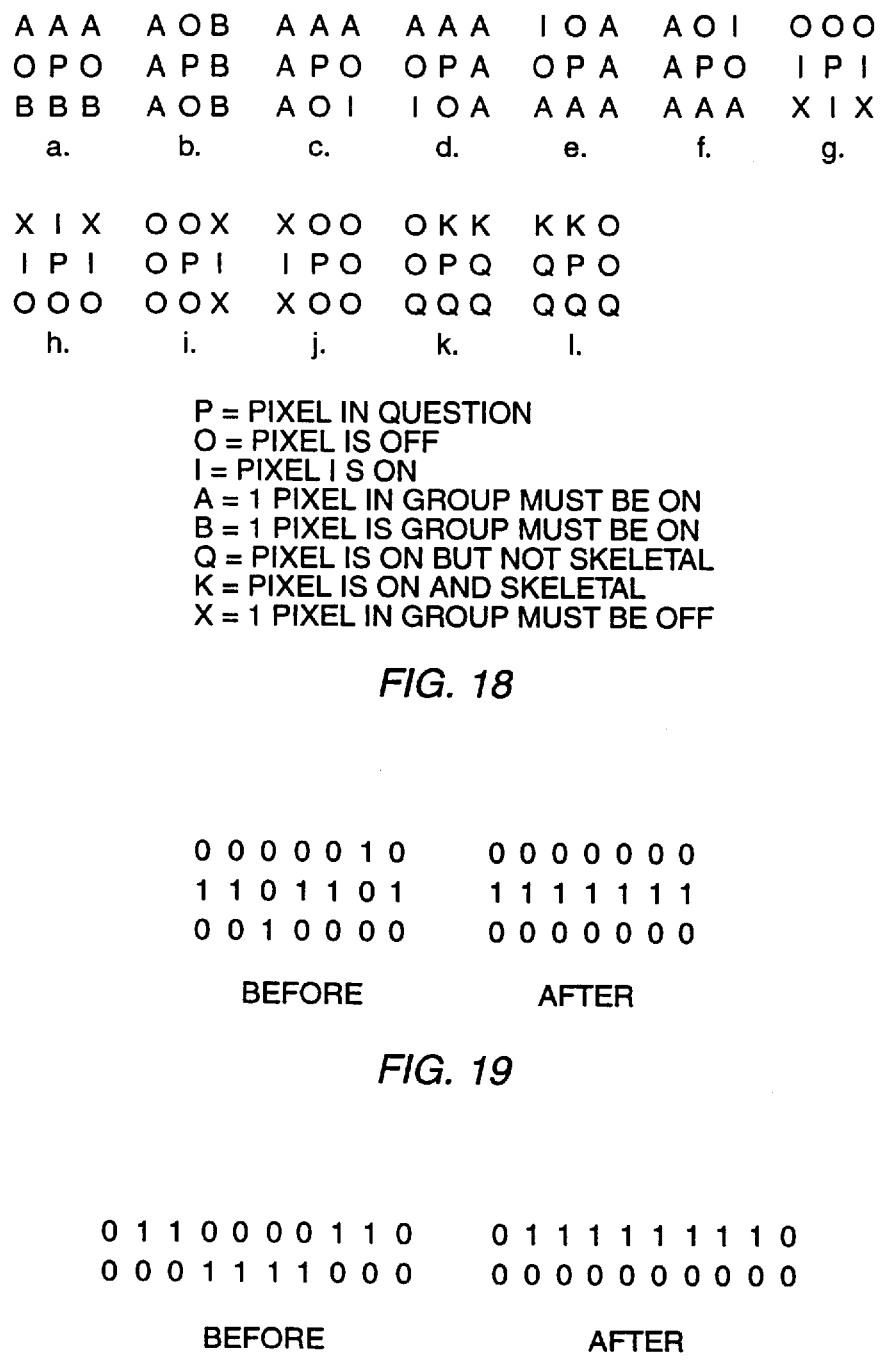

FIG. 18 is a diagram illustrating pattern matches for locating skeletal pixels.

FIG. 19 is a diagram illustrating line segment deviations.

FIG. 20 is a diagram illustrating gap filing.

FIGS. 21A, 21B, 21C are three fuzzy logic tables.

DETAILED DESCRIPTION OF SPECIFIC EMBODIMENTS

Figure 1:
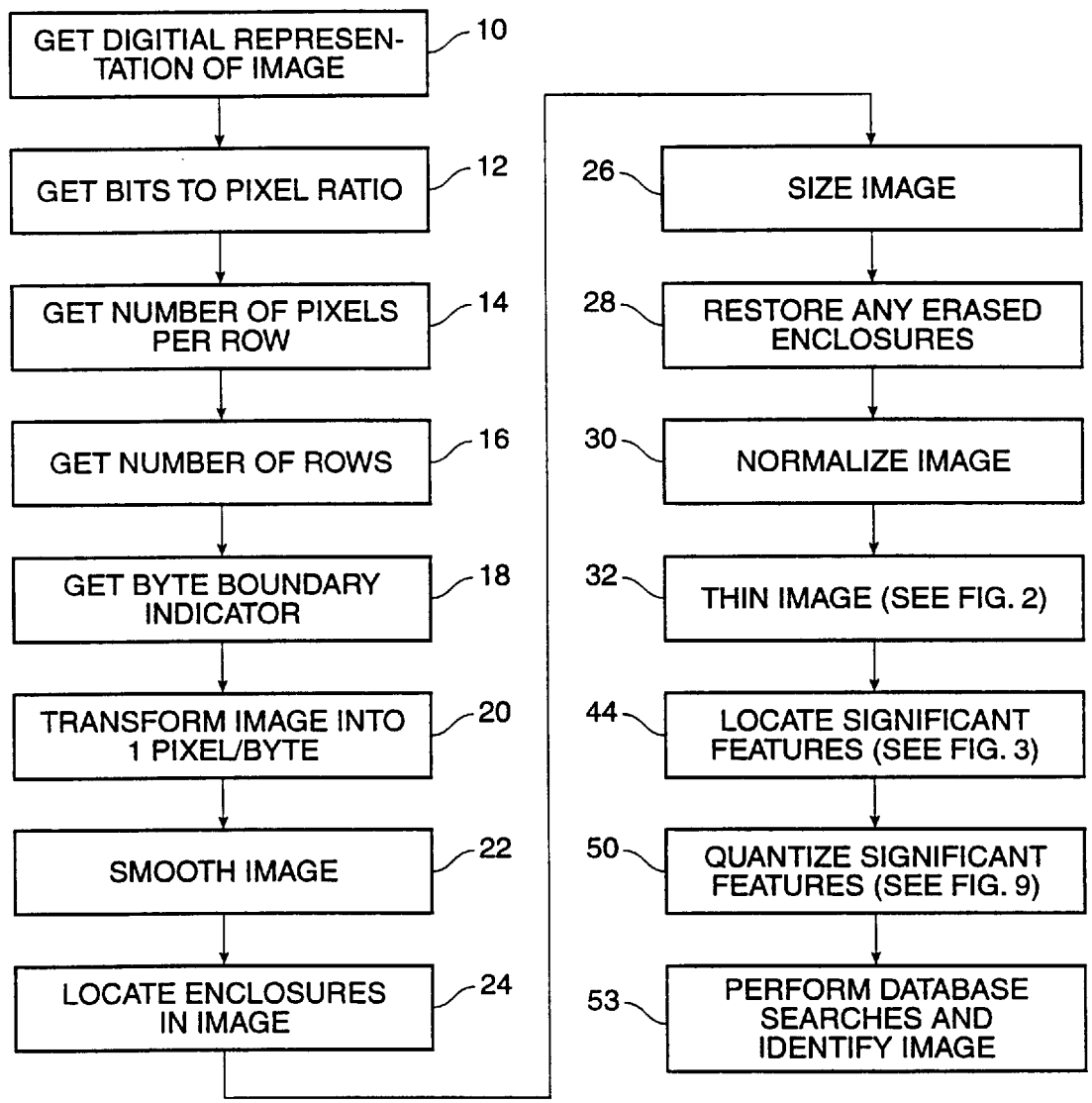
FIG. 1 is a flow chart of a process according to the invention.

The process of the invention is best described with reference to flow charts beginning with FIG. 1. There are five input parameters in the process, each being illustrated in terms of a step of the process. The first parameter is an array of blocks of information, typically bytes, which is a digital representation of the image 10, where each byte is eight bits long. The second input parameter is the number of bits that represent a pixel of the character image 12. If the image was originally in black and white, the bits to pixel ratio (bpr) will be one. The third input parameter is the number of pixels contained in a row of the character image 14. The fourth input parameter is the number of rows contained in the character image 16. The fifth parameter indicates if the rows begin on byte boundaries 18. If the rows begin on byte boundaries then the fifth parameter is set to one, otherwise the parameter is set to zero.

The first step in the recognition process is to unpack the input array so that one block, such as a byte represents one pixel 20, as follows: If the bpr equals one, each bit in the input array is examined separately. If a bit equals one, a corresponding byte in a secondary array (A2) is set to one else the corresponding byte is set to zero. If the bpr is greater than one, the bits are examined in groupings equal to the bpr. The bits in the grouping are logically ORed together. If the result of this ORing is equal to one then the corresponding byte in A2 is set to one; otherwise it is set to zero.

The image is then reduced so that it fits within a 38×18 matrix. If the image is initially smaller than 38×18 then no image reduction is necessary. The image reduction is accomplished by first smoothing the image by deleting any gaps that may have been introduced during the scanning process 22. Each byte representing a pixel is examined individually. If the byte is equal to one, the corresponding pixel is considered to be "on", and the next byte is examined. If the byte is equal to zero, the corresponding pixel is considered to be "off". If the value A2(xn,ym) represents the pixel in question, and if A2(xn,ym)=0 then the following pixels are examined (the nearest eight neighbors, as illustrated in FIG. 10):

A2(xn−1,ym−1)
A2(xn,ym−1)
A2(xn+1,ym−1)
A2(xn−1,ym)
A2(xn+1,ym)
A2(xn−1,ym+1)
A2(xn,ym+1)
A2(xn+1,ym+1)

If any of these pixels are off, A2(xn,ym)=0 is considered valid. If all of these pixels are on then the nearest forty-eight neighbors will be examined (see FIG. 11) i.e., the following pixels will be examined:

A2(xn−3,ym−3)
A2(xn−2,ym−3)
A2(xn−1,ym−3)
A2(xn,ym−3)
A2(xn+1,ym−3)
A2(xn+2,ym−3)
A2(xn+3,ym−3)
A2(xn−3,ym−2)
A2(xn−2,ym−2)
A2(xn−1,ym−2)
A2(xn,ym−2)
A2(xn+1,ym−2)
A2(xn+2,ym−2)
A2(xn+3,ym−2)
A2(xn−3,ym−1)
A2(xn−2,ym−1)
A2(xn+2,ym−1)
A2(xn+3,ym−1)
A2(xn−3,ym)
A2(xn−2,ym)
A2(xn+2,ym)
A2(xn+3,ym)
A2(xn−3,ym+1)
A2(xn−2,xn+1)
A2(xn+2,xn+1)
A2(xn+3,ym+1)
A2(xn−3,ym+2)
A2(xn−2,ym+2)
A2(xn−1,ym+2)
A2(xn,ym+2)
A2(xn+1,ym+2)
A2(xn+2,ym+2)
A2(xn+3,ym+2)
A2(xn−3,yn+3)
A2(xn−2,ym+3)
A2(xn−1,ym+3)
A2(xn,ym+3)
A2(xn+1,ym+3)
A2(xn+2,ym+3)
A2(xn+3,ym+3)

If one of the above pixels is off then A2(xn,ym)=0 is considered invalid and A2(xn,ym) is set equal to one. If all the above pixels are on, A2(xn,ym)=0 is considered valid.

After the image has been smoothed, the location of each "enclosure" is found 24. An "enclosure" is defined as a set of contiguous pixels which are off and which are totally surrounded by a set of contiguous pixels which are on. In other words, an enclosure defines a boundary. The locations of the boundary pixels of each enclosure are saved in an array.

Once the enclosures have been identified, the image is sized 26. The horizontal length of the image (^x) and the vertical length of the image (^y) are computed. Next divisors are calculated such that the divisor for the x direction (x_div) is equal to ^^x/37 and the divisor for the y direction (y_div) is equal to ^y/17. A correspondence is then established such that any pixel located at (x,y) in array A2 is located in the reduced array (A3) at (x',y') where x'=x/x_div and y'=y/y_div. If a condition occurs such that A2(x1,y1), A2(x2,y2), . . . ,A2(xn,yn)==>A3(x',y') then the value of A3(x',y') will bet set to the logical or of [A2(x1,y1),A2(x2,y2), . . . ,A2(xn,yn)].

Next the boundaries of each enclosure are reexamined. The boundaries of each enclosure are transformed into points in A3. If all the points of the enclosure are on in A3, the center of the transformed enclosure is computed and set to zero. Thus, any enclosure that is erased by the reduction is restored 28.

The image is now ready to go through a normalization process 30. The normalization process erases pixels that belong to stray marks. The normalization process is based on the assumption that intentional marks have a width greater than one pixel (>0.1 mm). Established rules are followed during the normalization process:

1. If a pixel in the top row of the image is on and the bottom six neighbors are all off then the pixel is turned off (see FIG. 12).
2. If a pixel in the top row of the image is off and the pixels on both sides are on then the pixel is turned on.
3. If a pixel is on and is not in the top or bottom row of the image and the top six neighbors are off then the pixel is turned off (see FIG. 13).
4. If a pixel in the bottom row of the image is on and the top six neighbors are all off then the pixel is turned off.
5. If a pixel in the bottom row of the image is off and the pixels on both sides are on then the pixel is turned on.
6. If a pixel is on and it is not in the top or bottom row and it is not in the first or last column, if the top six neighbors or the bottom six neighbors are all off then the pixel is turned off.
7. If a pixel is off and is not part of an enclosure and the twelve nearest neighbors are on then the pixel is turned on (see FIG. 14).
8. If a pixel is on and fewer than two of the nearest eight neighbors are on then the pixel is turned off (see FIG. 15).
9. If a row is separated from the image by a blank row immediately above and below then the row is deleted.
10. Let a row segment be defined as a set of consecutive pixels in the same row which are on. Let a row gap be defined as a set of consecutive pixels in the same row which are off. If the first three rows of an image each contain one and only one gap and each gap is directly above the gap in the succeeding row and each gap is shorter in length than the succeeding gap and the gap in the top row is less than five pixels in length then the pixels in the top gap are turned on (see FIG. 16).

11. If a row segment in the top row is less than five pixels long and it is adjacent to a row segment in the succeeding row and the start column of the row segment is to the right of the start column of the adjacent row segment and the end column of the row segment is to the left of the end column of the adjacent row segment then the row segment is deleted (see FIG. 17).

12. If a row segment in the bottom row is less than five pixels long and it is adjacent to a row segment in the preceding row and the start column of the row segment is to the right of the start column of the adjacent row segment and the end column of the row segment is to the left of the end column of the adjacent row segment then the row segment is deleted.

Figure 2B:
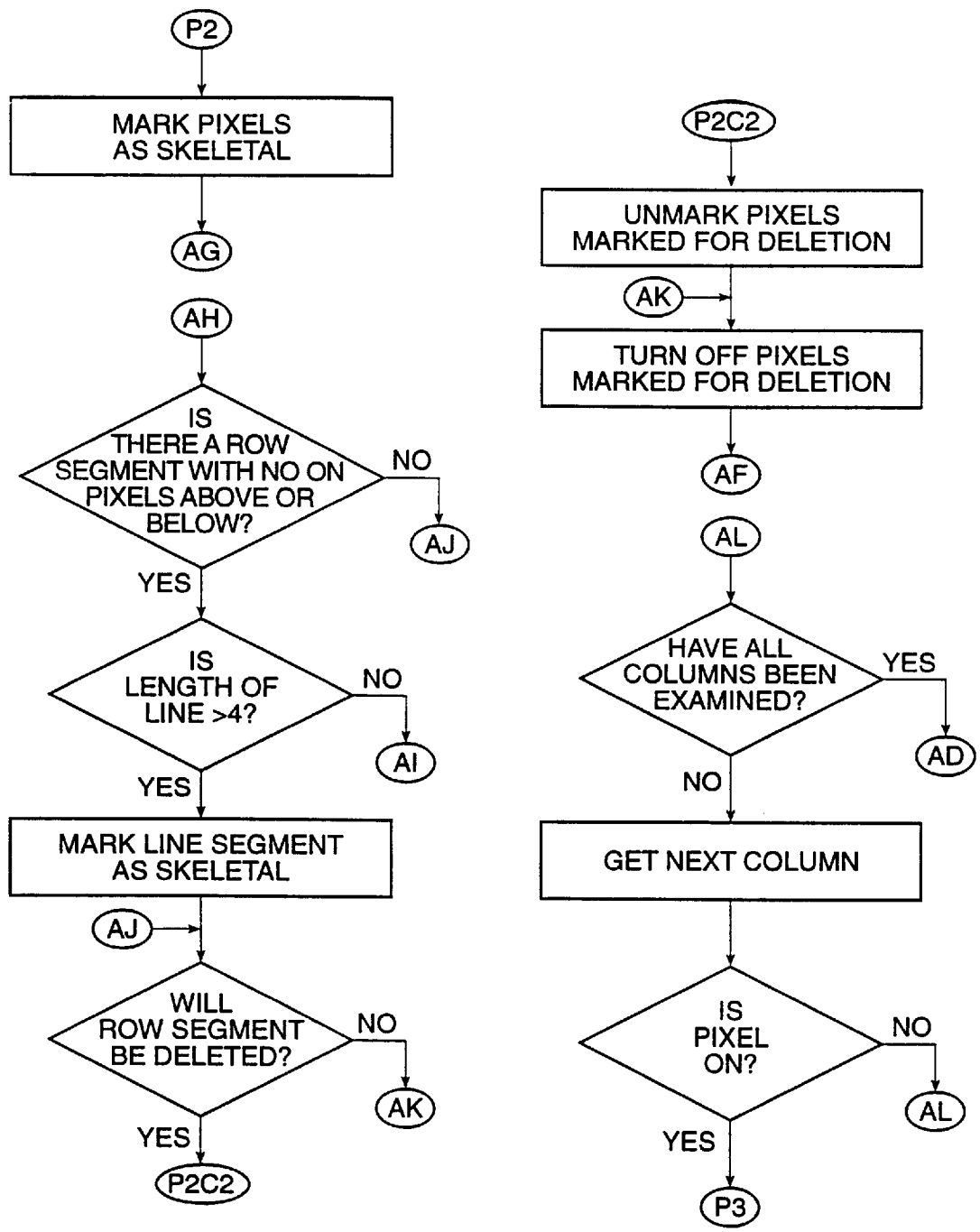
Figure 2C:
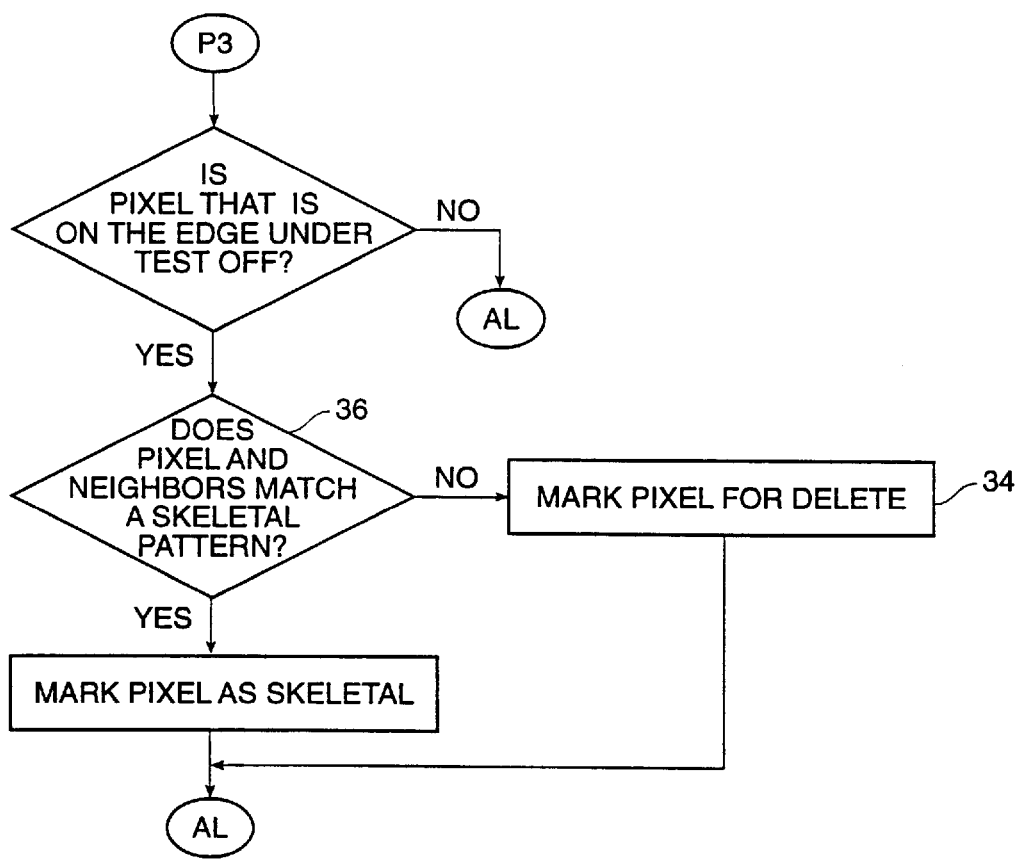

Once the image has been normalized, the entire image is shifted to the left so that the first non-blank column of the image begins in column zero. The image can now be thinned 32. Thinning removes extraneous pixels from the image so that only the basic skeleton image remains. By performing recognition on a skeleton image, mistakes in recognition due to varying stroke width and size are eliminated. The thinning algorithm is based on work of Theo Pavlidis. FIGS. 2A, 2B, 2C are a detailed flow chart of the algorithm used herein, which is self-explanatory. The algorithm presented by Pavlidis, in some instances, causes important features of alphanumeric characters to be lost. To avoid feature loss, major modifications were made to the algorithm as herein disclosed. The significant aspects and steps of the modified algorithm are as follows:

1. The image is examined for pixels to delete, one edge at a time. The pixels are examined beginning with the right side followed in sequence by the top, left side and bottom.
2. During each examination, pixels are determined to be skeletal pixels (36) by comparing the pixel and its eight nearest neighbors to a predetermined set of patterns. If the pixel and its neighbors match any of the patterns, the pixel is said to be skeletal. There are twelve patterns against which the pixel and its neighbors are compared. (See FIG. 18.)
3. After the pixels in one row have been examined, they are then reexamined to determine if any row segments in the row are skeletal. If a row segment is longer than three pixels (40) and the pixels in the rows directly above and below the row segment are off (38) then all pixels in the row segment are considered to be skeletal (42).
4. At the end of the processing of each edge, vertical lines are examined to ensure that no vertical line will be deleted erroneously. If a line is longer than two rows and the line is not greater than two pixels wide, then the line is considered to be skeletal.
5. After the processing of each edge is complete, pixels on the edge which have been examined, which are not skeletal, are set to zero.
6. The entire process is repeated until the image contains only skeletal pixels.
7. The edges of the skeletal image are examined for line deviations, i.e., pixels that are shifted by one pixel out of a row segment or a line segment (see FIG. 19). Such pixels are brought back into alignment with the row or line segment.
8. The skeletal image is scanned for row segments which can be moved into a gap between two row segments in either the preceding or succeeding row to form a single row segment. In addition to meeting the aforementioned criteria, for a row segment to be moved, the row segment cannot be part of a diagonal line and the movement of the row segment cannot create a blank line unless the blank line is at the top or bottom of the image (see FIG. 12).
9. The image is shifted and reduced/enlarged so that it fits exactly in a sparse space (20×12) matrix.

Figure 3A:
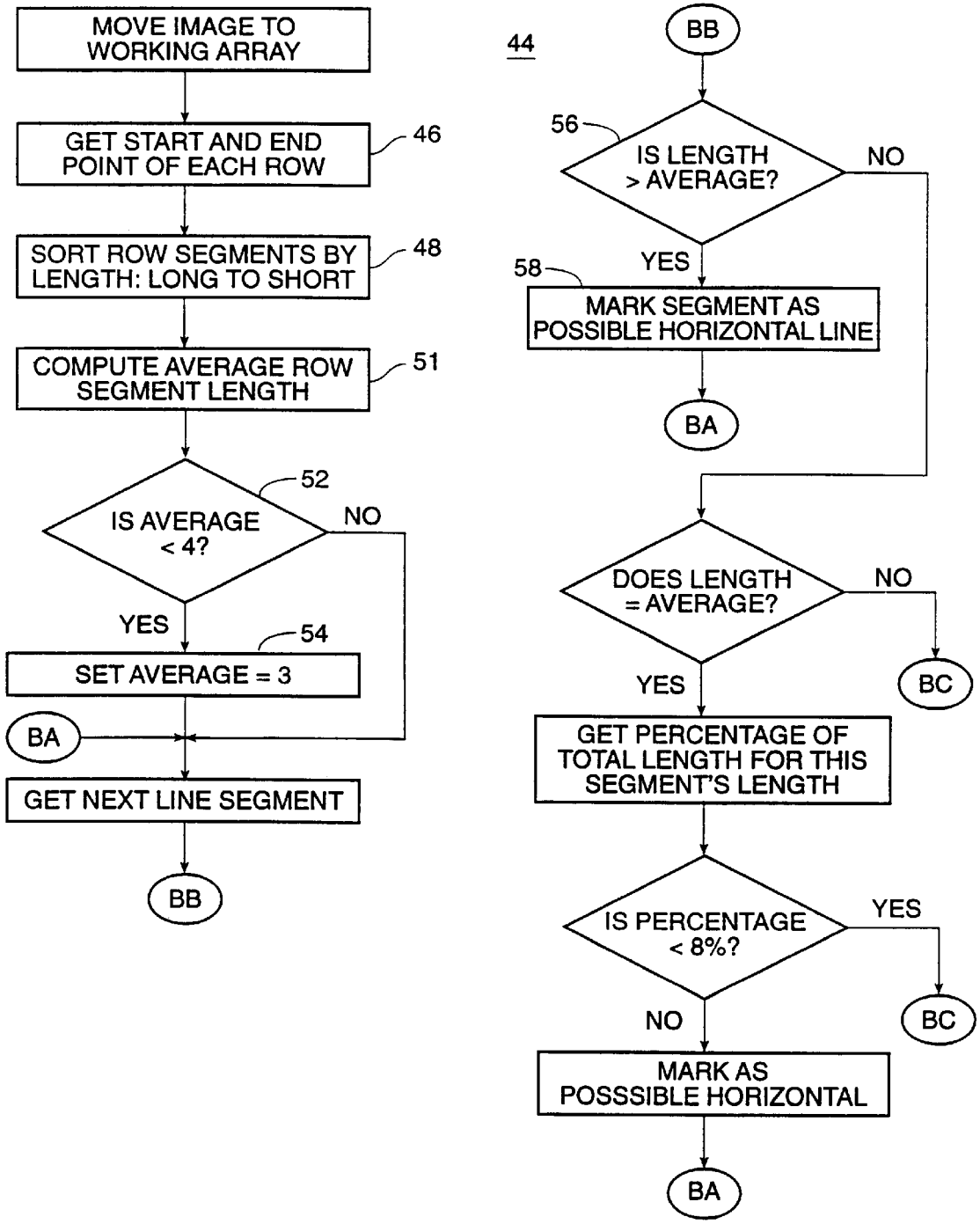
FIGS. 3A, 3B, 3C together are a flow chart of an algorithm for finding features.
Figure 3B:
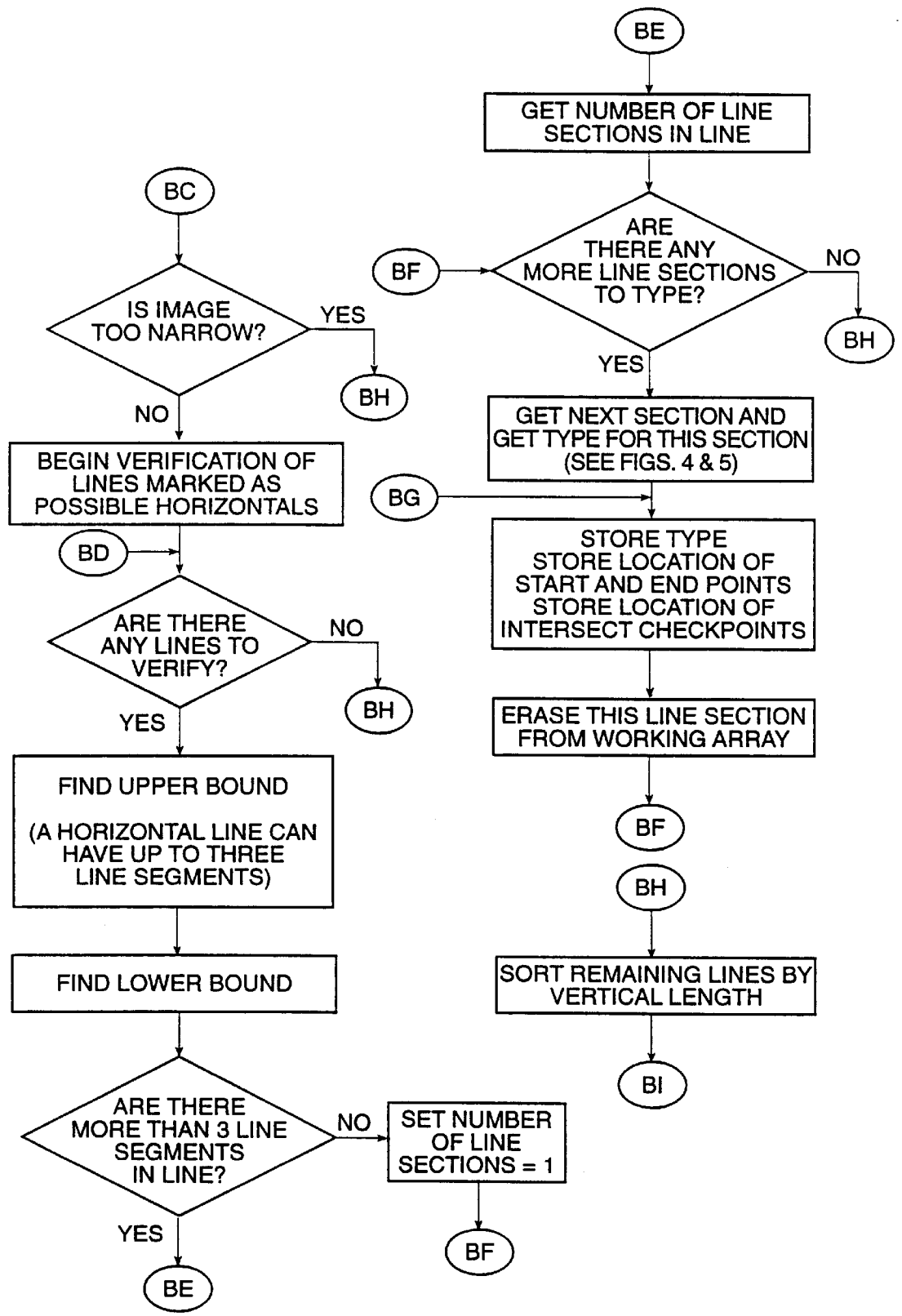
Figure 3C:
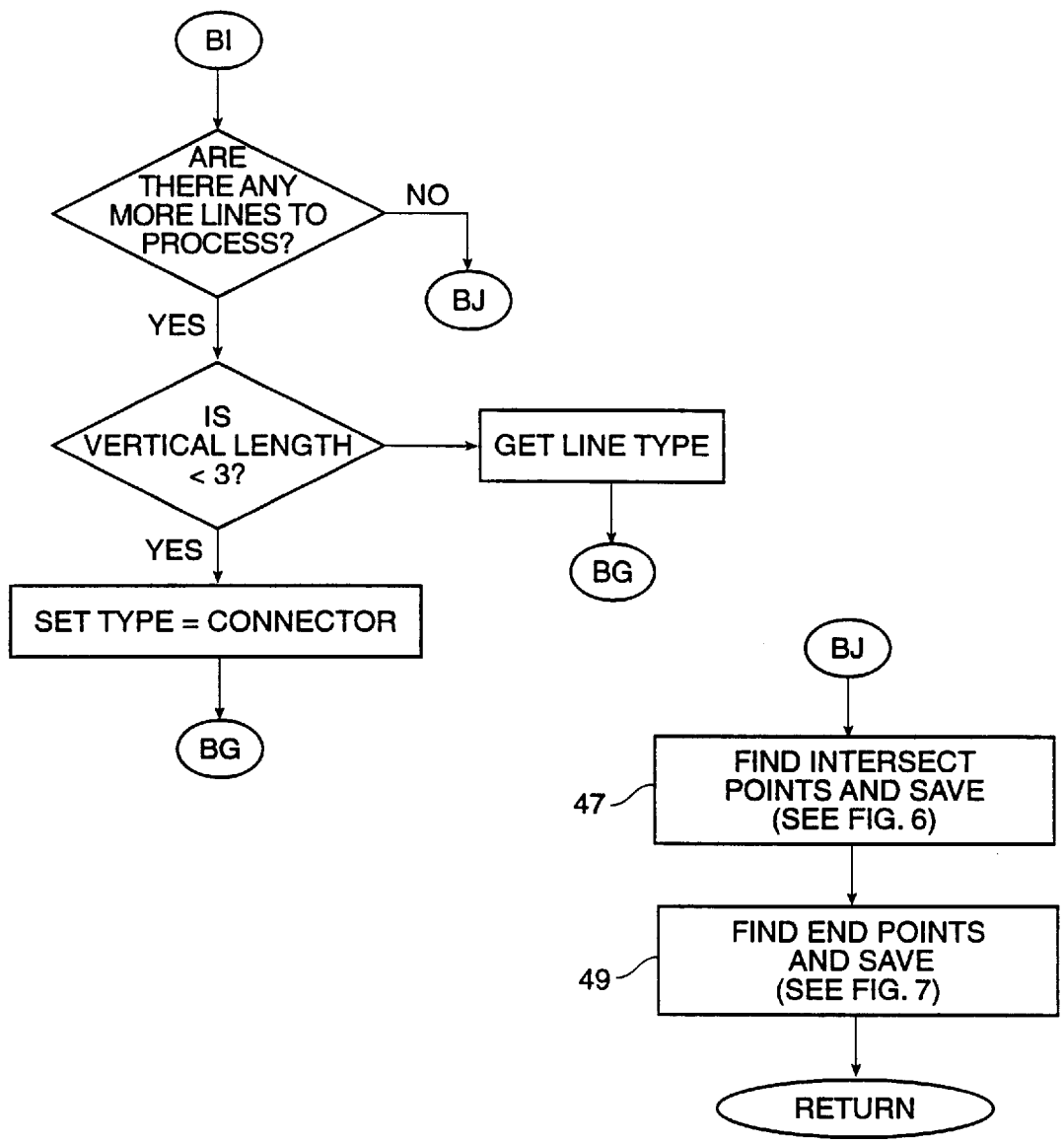
Figure 4A:
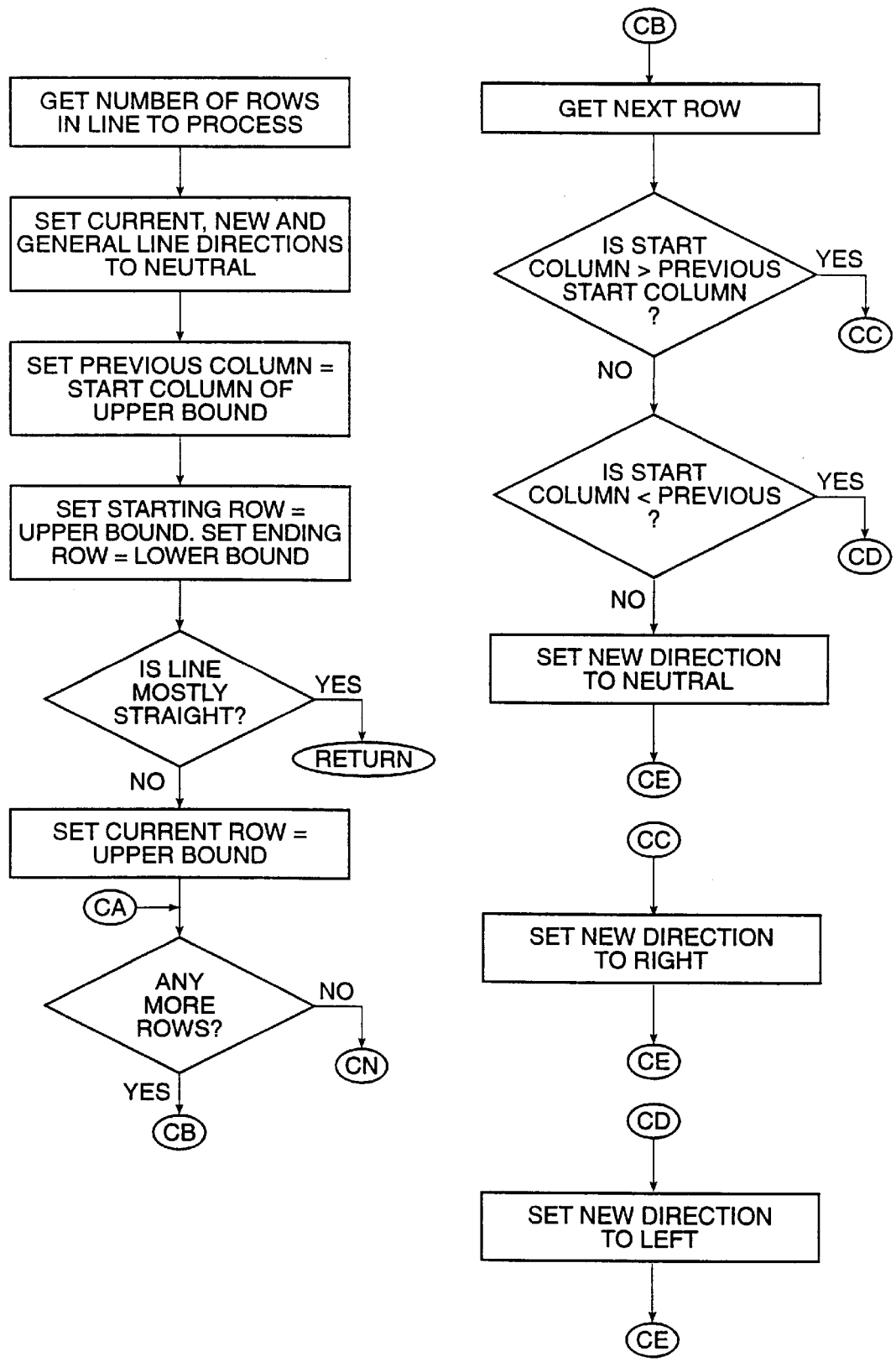
FIGS. 4A, 4B, 4C, 4D together are a flow chart of an algorithm for getting line sections.
Figure 4B:
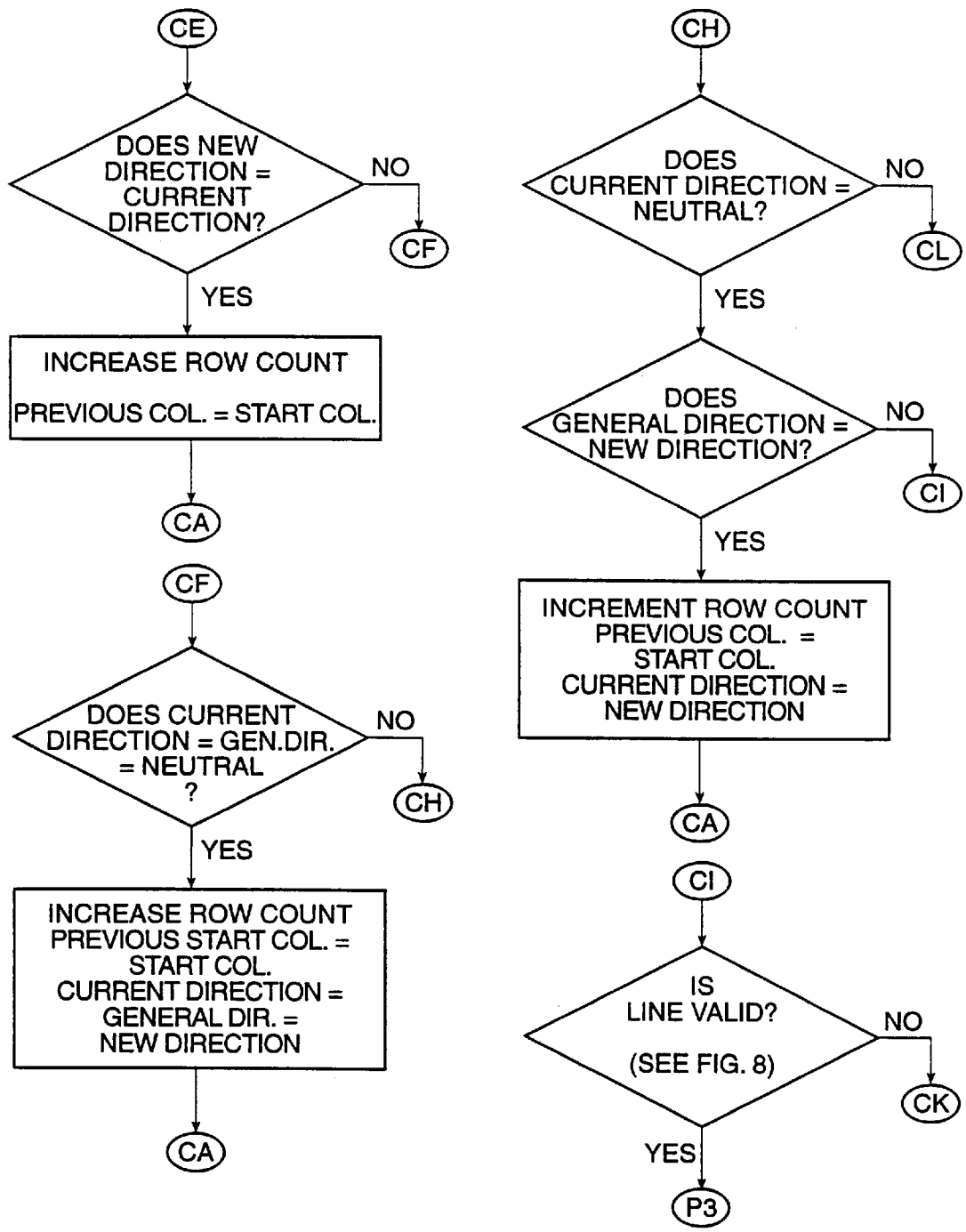
Figure 4C:
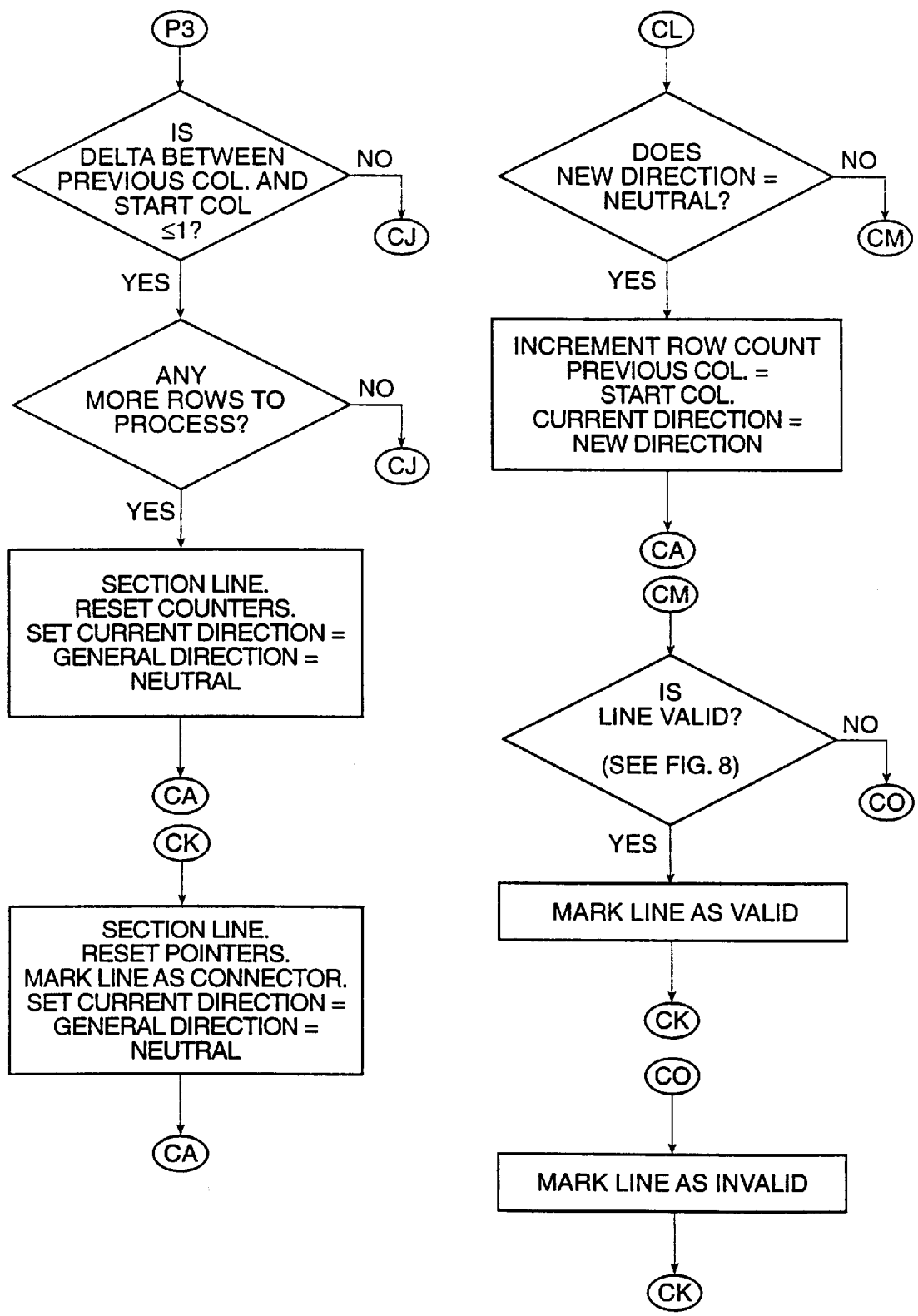
Figure 4D:
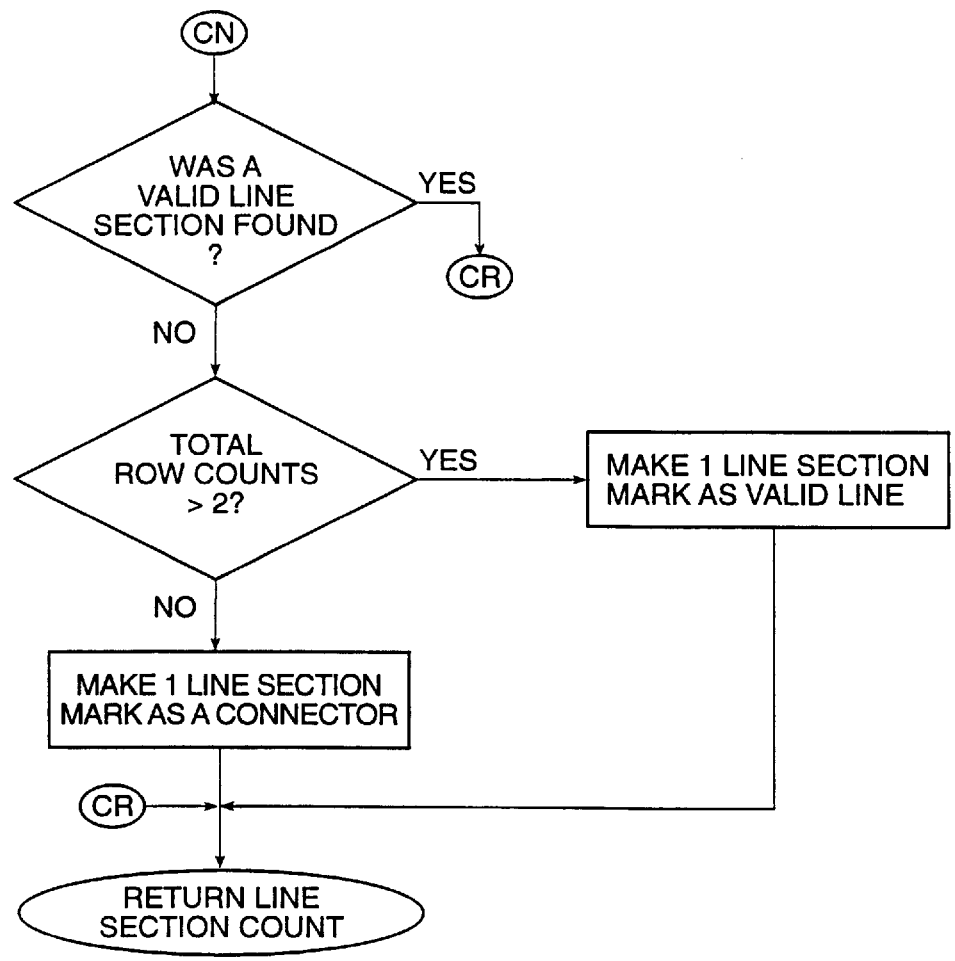
Figure 5A:
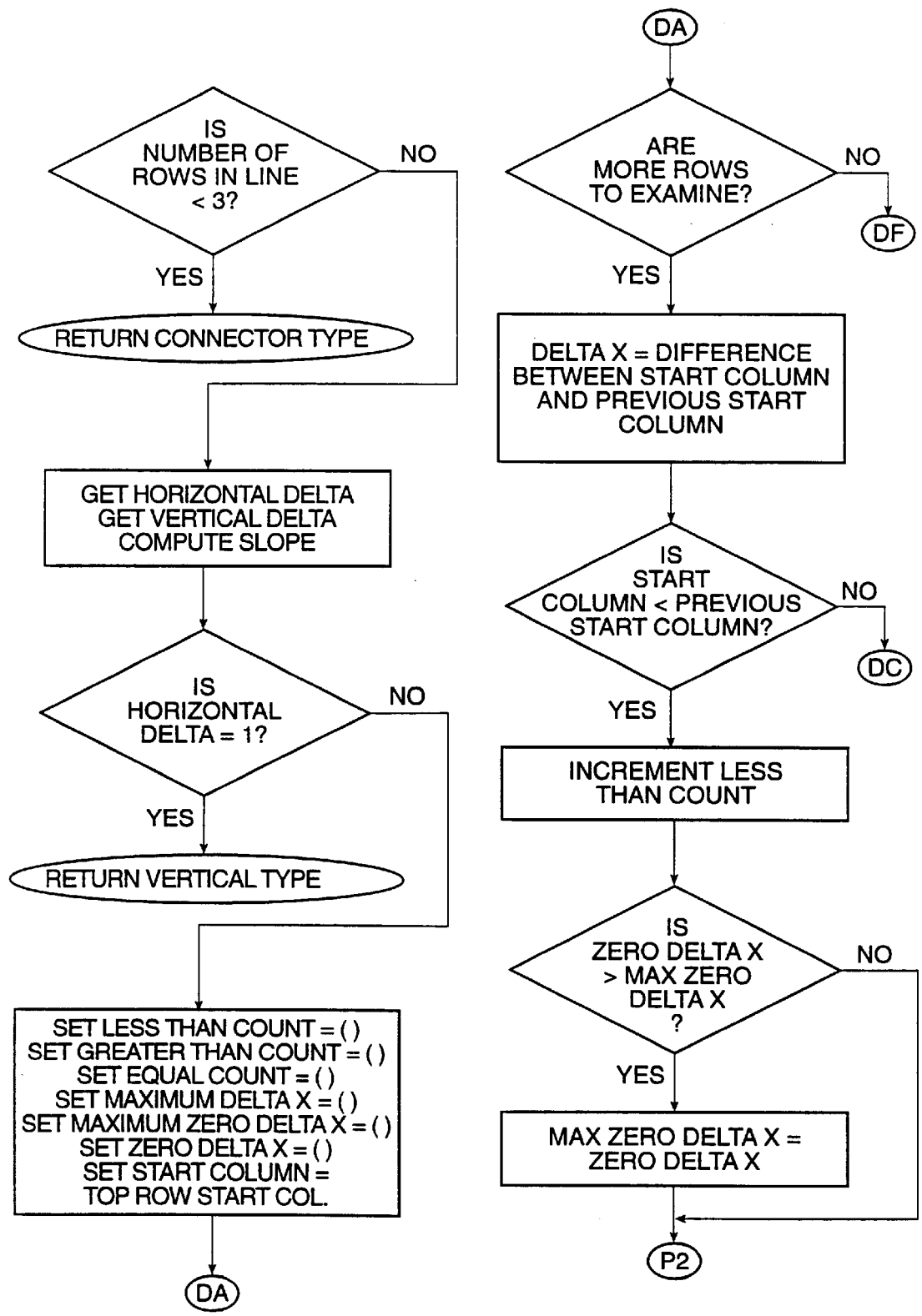
FIGS. 5A, 5B, 5C, 5D together are a flow chart of an algorithm for getting line type.
Figure 5B:
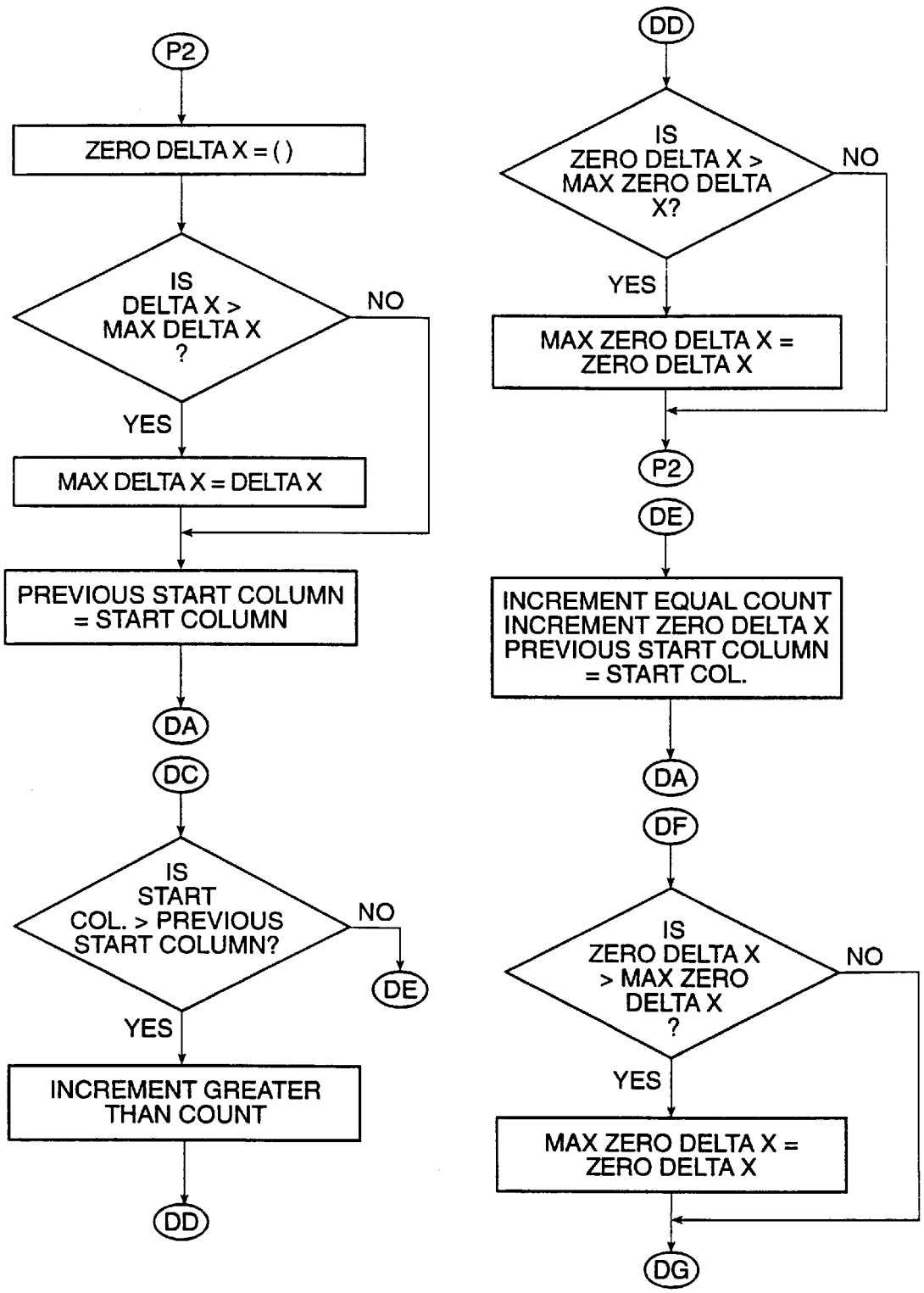
Figure 5C:
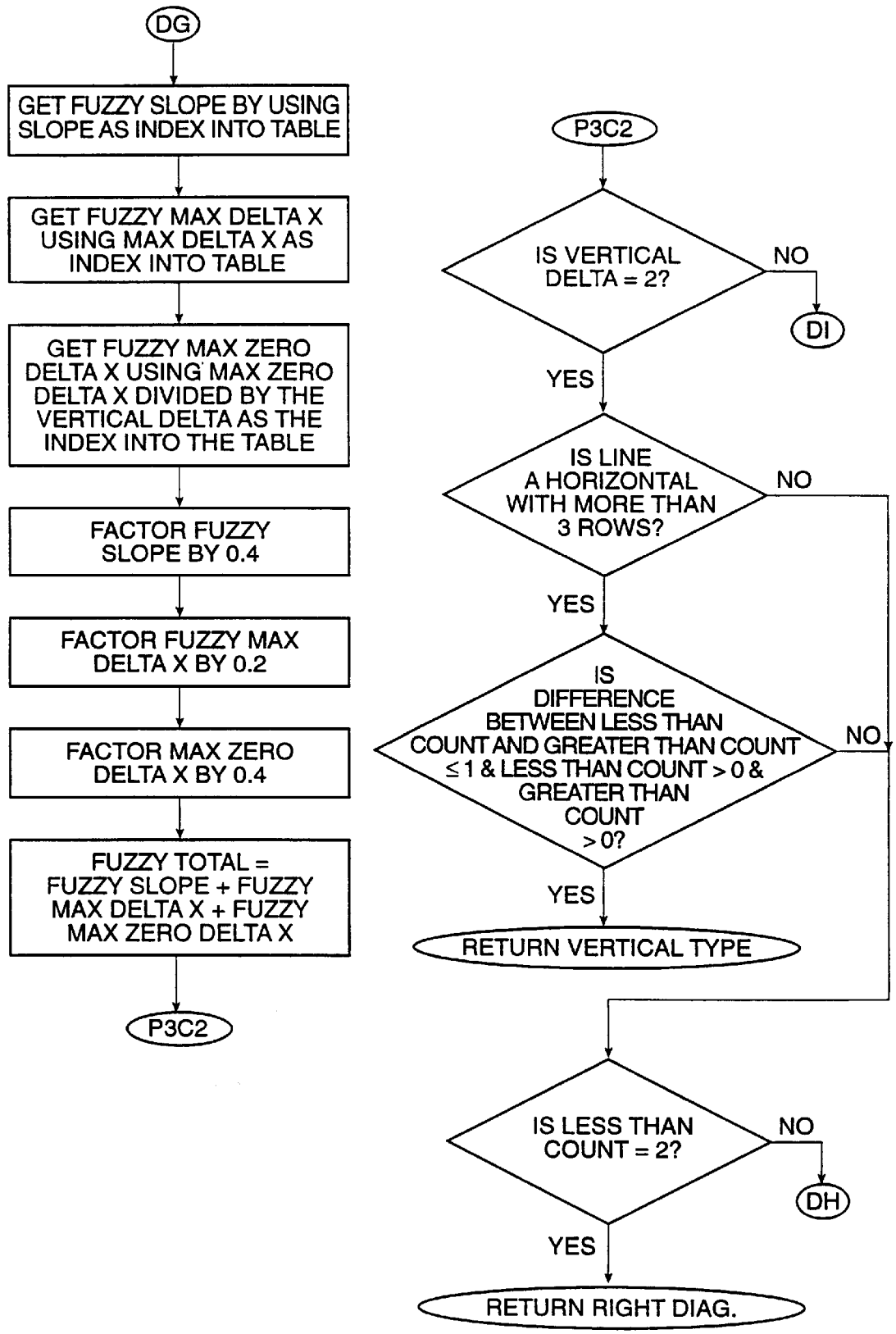
Figure 5D:
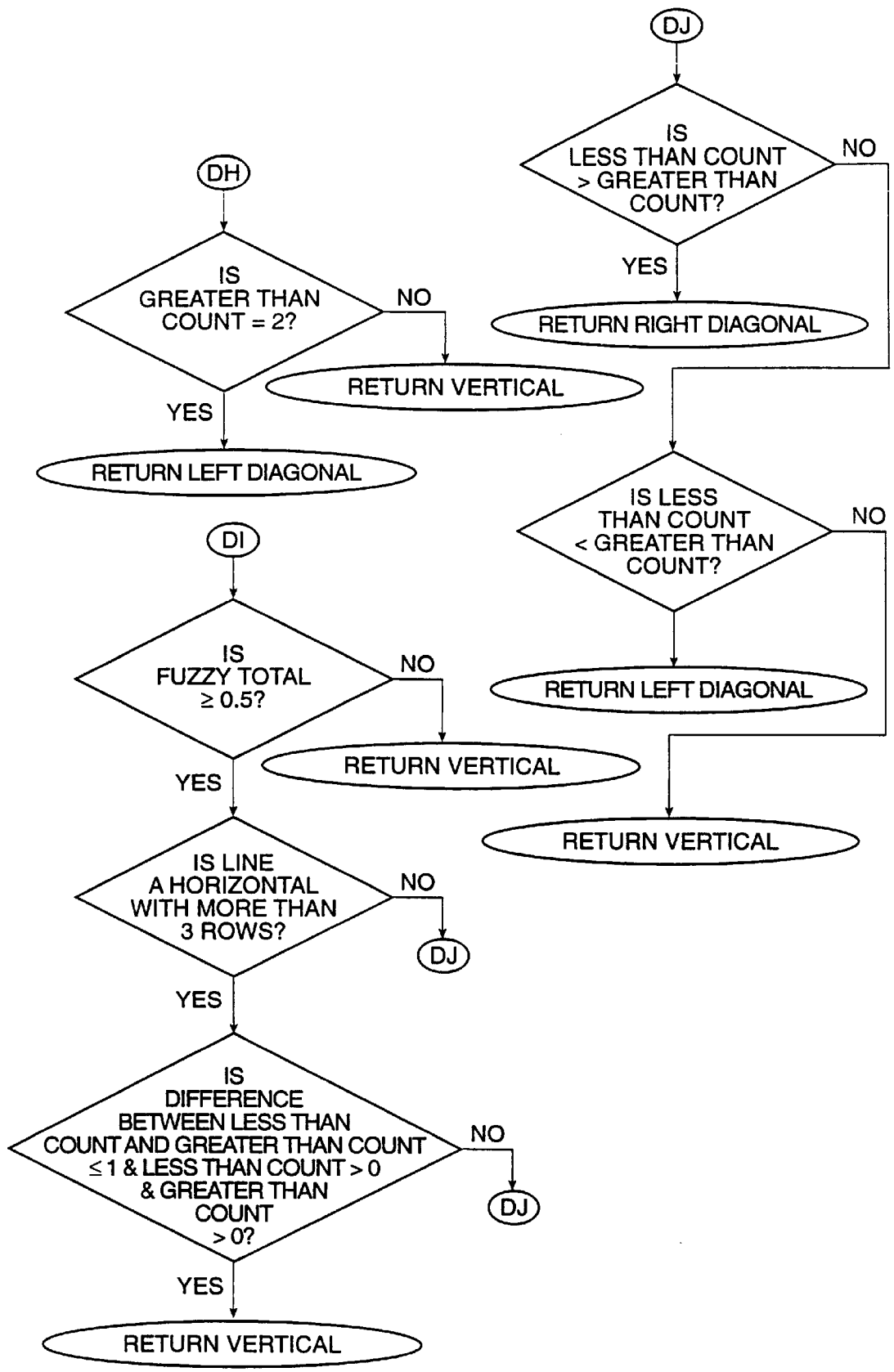

After thinning, the image is examined for features (44) (see FIGS. 3A, 3B, 3C). The first features examined are horizontal lines. A horizontal line is defined as a row segment that is just as long or longer than the average length of all the row segments in the image. The process begins by scanning each row for row segments. If a row segment is found, the segment's length, row, starting column and ending column are recorded in a table (46). After all rows have been scanned, the table is sorted by length in descending order (48). The length of each row segment is added to a total. The longest length and shortest length are subtracted from the total. The total is then divided by the total number of row segments minus two to determine the average length (51). If the average length is less than four pixels long (52), the average length is assigned a value of three (54). By forcing the average length to be three, the possibility of finding horizontal lines where none exist is eliminated.

The sorted horizontal table is processed next. Each entry's length is checked against the average length (56). If the entry's length is greater than or equal to the average length, the entry is examined for connectivity. If a row segment is adjacent (above or below) a smaller row segment whose length is longer than or equal to the average then the second row segment is said to be part of the first. This chain of row segments is continued until there are no adjacent row segments or until there is more than one adjacent row segment or until the starting column of a row segment is out of sequence with the start columns of the previous row segments.

Let S0, S1, S2 and S3 represent the starting columns of row segment zero, row segment one, row segment two and row segment three. If S0>=S1>=S2 and S2<S3 or if S0<=S1<=S2 and S2>=S3 then S3 is said to be out of sequence. If the number of row segments in the chain is greater than three, the chain is processed as a vertical/diagonal. If the number of row segments in the chain is less than or equal to three, the chain is processed as a horizontal. To finish the horizontal processing, the beginning and ending rows of the chain and the beginning and ending columns of the chain are recorded in the "found features" table. After the thinned image has been saved the chain is erased from the image, i.e., all the pixels in the chain are set to zero.

Next, the partially erased image is searched for vertical/diagonal lines. Chains of row segments are found in the same manner as discussed above. Only chains whose vertical lengths are greater than or equal to three rows are used. Once a valid chain has been found, it must be determined if the chain is a vertical or diagonal. This determination is made by using fuzzy logic (see FIGS. 4 and 5). Three components of the chain are examined to determine the line type. The three components are the slope of the line, the maximum change in the horizontal direction between two rows (maximum delta x) and the maximum number of consecutive rows where there was no change in the horizontal direction divided by the total change in the vertical direction (zero slope). Based on its computed value, each component is assigned a value between 0.1 and 1.0. Tables in FIGS. 21, 21B, and 21C show the correlation between a component's actual value and its assigned value. Once the values have been assigned, each component value is multiplied by a relevancy factor. For the slope and zero slope the relevancy factor is 0.4. For the maximum delta x the relevancy factor is 0.2. After the component values have been factored, they are added together. If the total (as rounded) is less than 0.5, the line is considered to be a vertical. If the total is greater than or equal to 0.5, the line is considered to be a diagonal. For diagonals, if the starting column increases with each succeeding row then the diagonal is a left diagonal. Otherwise, the diagonal is a right diagonal. The locations and types of the verticals and diagonals are recorded in the "found features" table and the lines are erased from the image. The remaining row segments are considered to be connecting lines. The row segment locations are recorded in the "found features" table.

Figure 6:
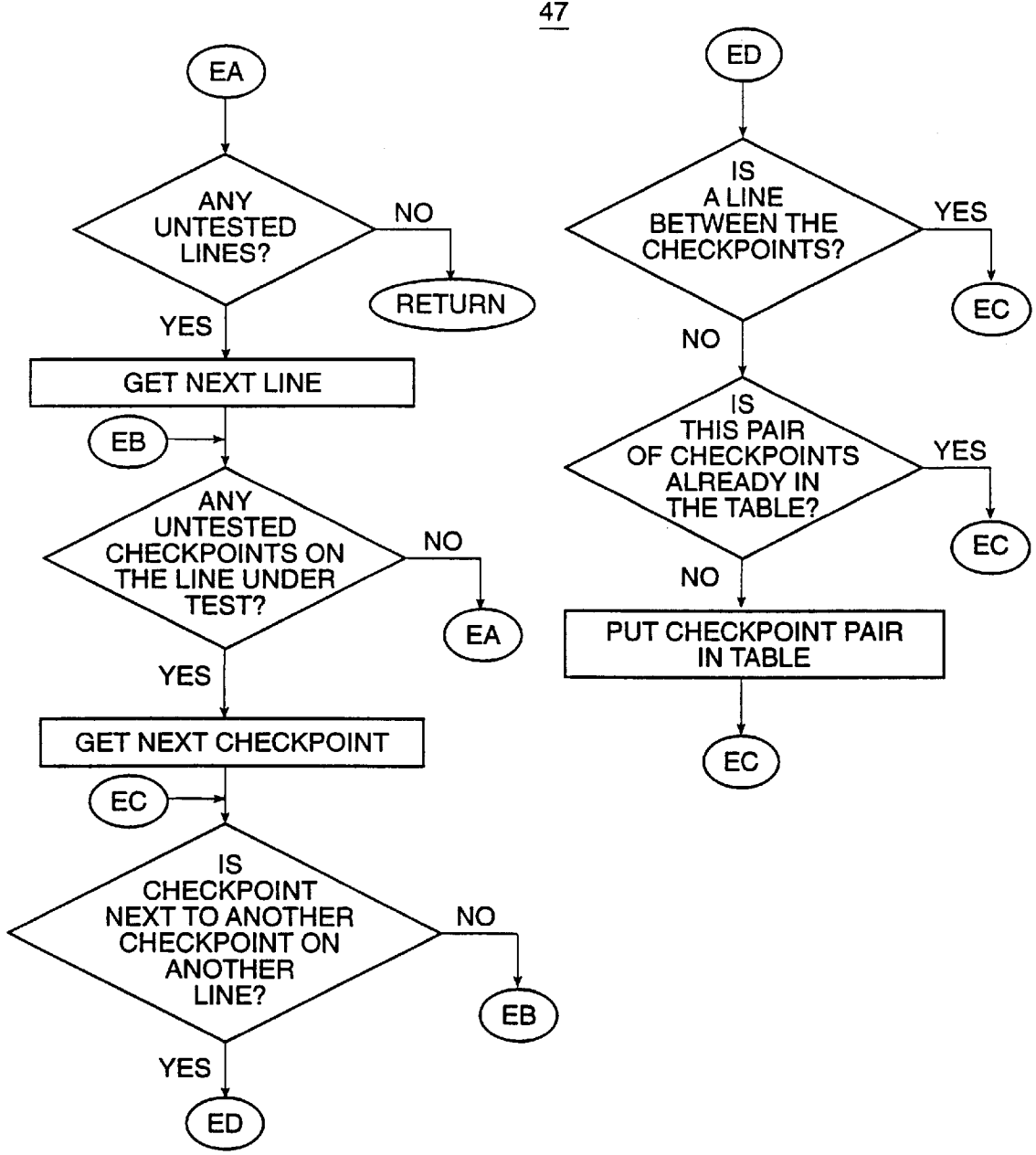
FIG. 6 is a flow chart of an algorithm for finding intersect points.
Figure 7:
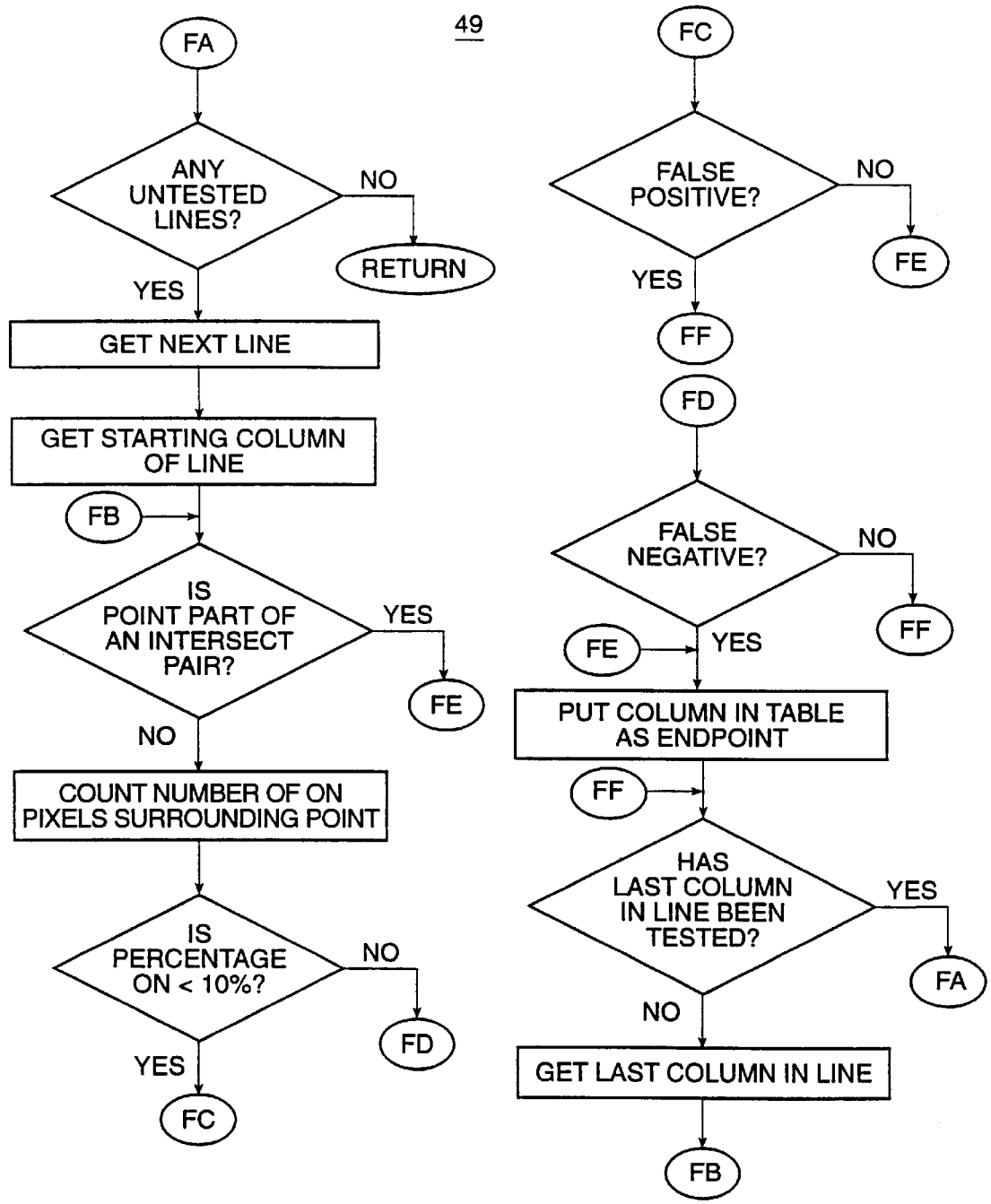
FIG. 7 is a flow chart of an algorithm for finding endpoints.
Figure 8:
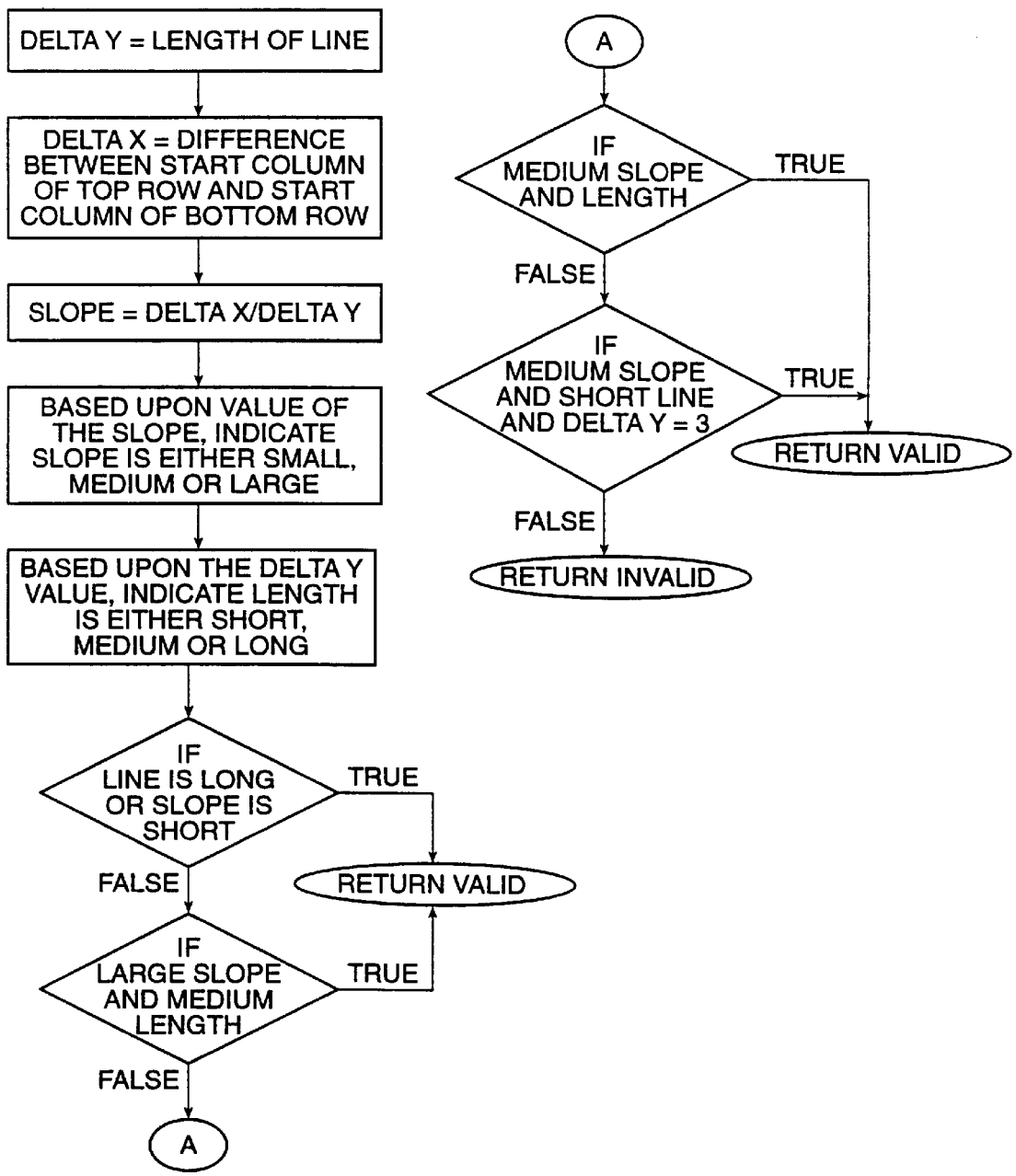
FIG. 8 is a flow chart of an algorithm for finding a valid line.

After all lines have been cataloged, a search is made for intersect points (47) (see FIG. 6). An intersect point is an end point of a line segment that is adjacent to a point on another line segment. Since the location of each end point is recorded in the "found features" table, it is easy to search the table to find which end points intersect with other line segments. As each intersect point is found, the location is recorded in an intersect table (see FIG. 6). Once all the intersect points have been found, the locations of the end points which do not intersect other line segments are recorded in an end point table (49) (see FIG. 7). To avoid placing too much emphasis on what might be errant strokes, the end points of connecting lines can be marked as intersect points. However, the end points of connecting lines are not placed in the end point table.

Figure 9A:
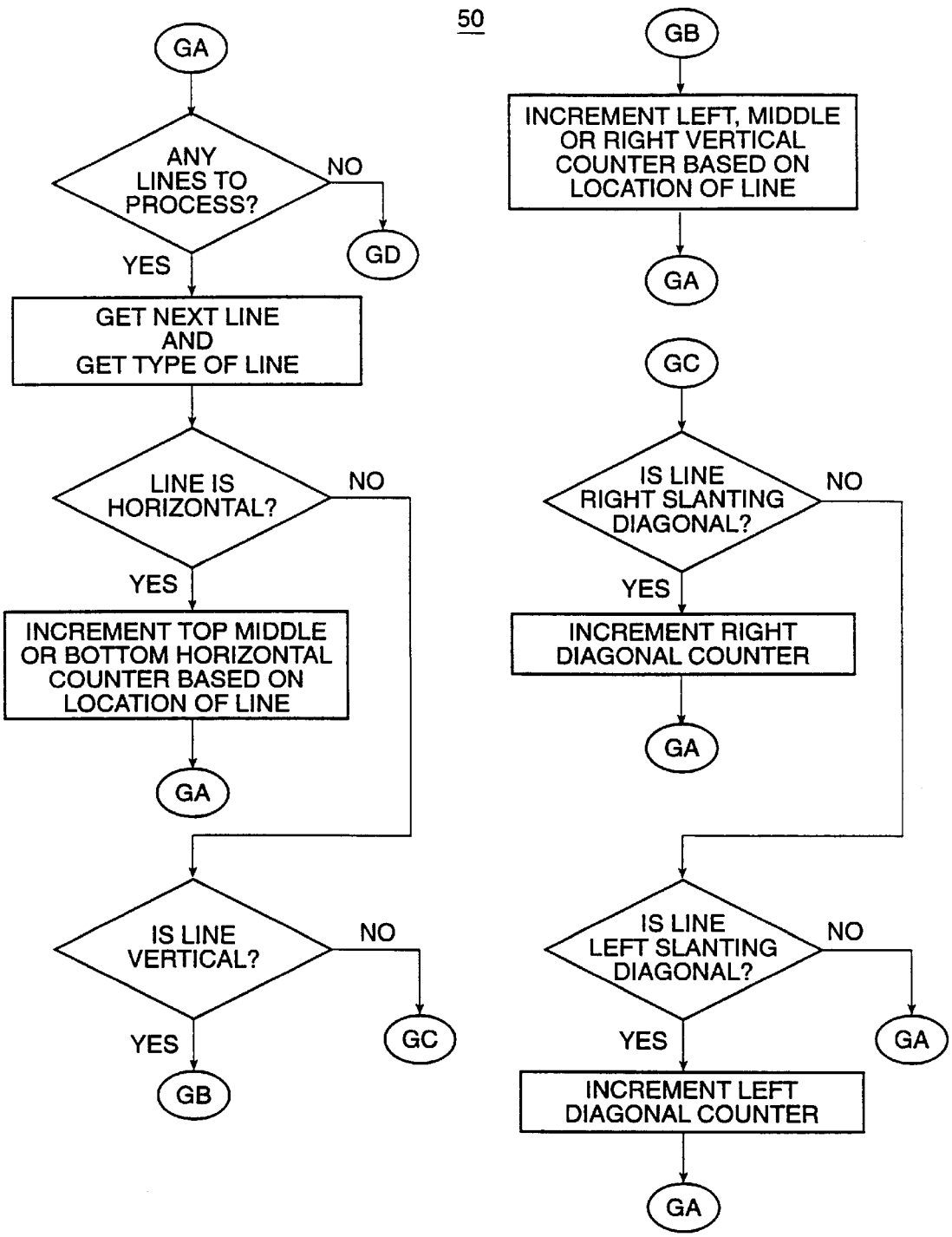
FIGS. 9A, 9B, 9C together are a flow chart of a quantization algorithm.
Figure 9B:
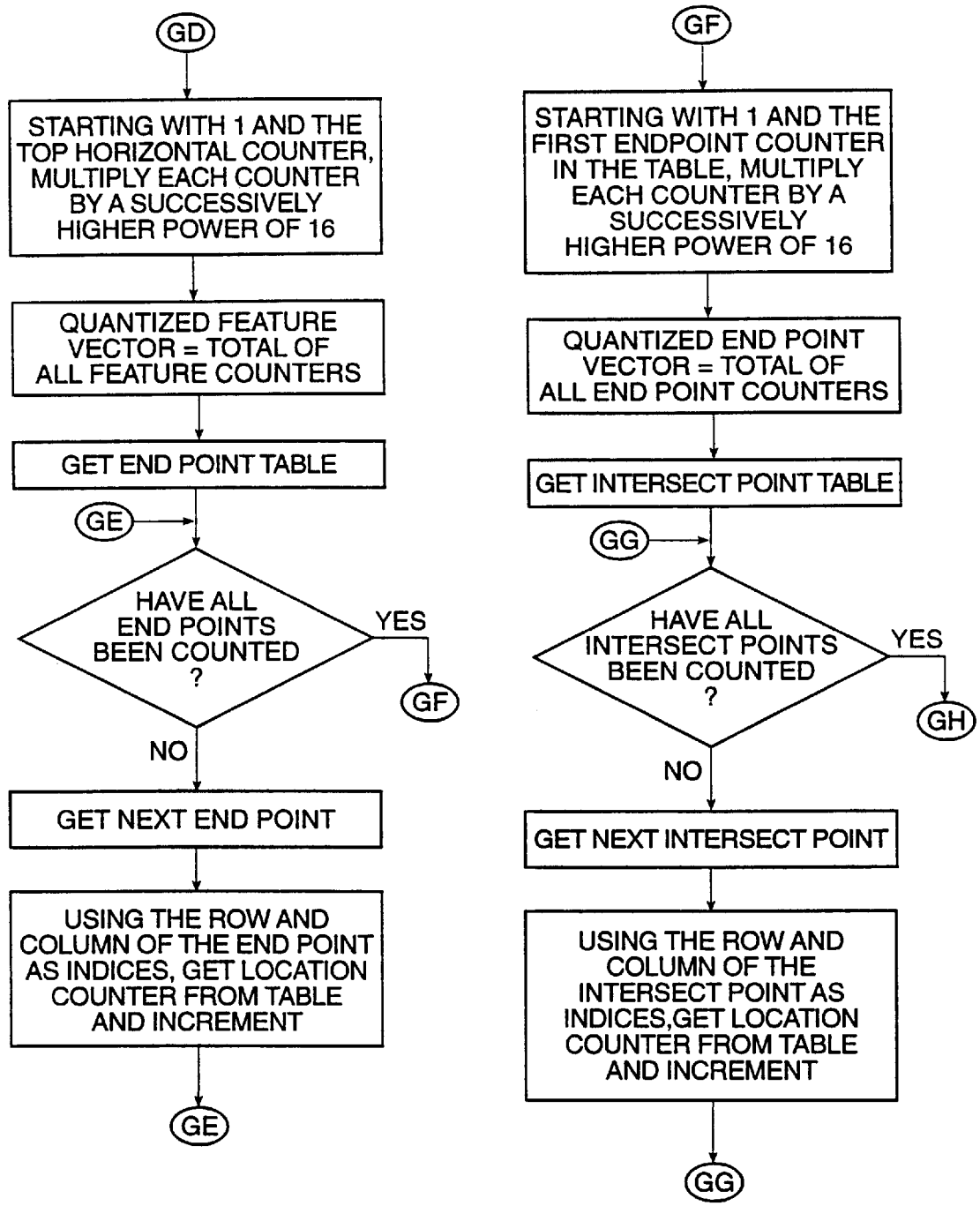
Figure 9C:
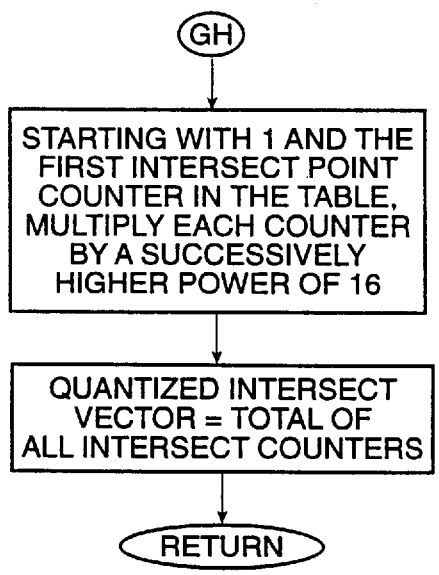

At this point in the process, the information needed to identify the character has been gathered. However, this information must be quantized to make an efficient database search possible (50, FIG. 1). The quantization is done by assigning numerical values to the features, intersect points and endpoints (50) (see FIGS. 9A, 9B, 9C). For the features, if a horizontal line is in the top four rows of the image, it is assigned a value of 1. If it is in the middle four rows it is assigned a value of 16. If the horizontal line is in the bottom four rows it is assigned a value of 256. If a vertical line is in the left six columns it is assigned a value of 4096. If it is in the middle eight columns it is assigned a value of 65536. If the vertical line is in the right six columns, it is assigned a value of 1048576. A left diagonal is assigned a value of 16777216 and a right diagonal is assigned the value 268435456. Connecting lines are assigned a null value. The values for the features are added and the total saved as the feature value (FV). Values for the end points (EV) and intersect points are calculated in the same manner.

Next the locations of the diagonal lines are further quantized to assist in character selection when identical FV,EV and IV values assigned to more than one character. First, each diagonal is assigned an octal number based upon its horizontal and vertical locations. The values for all left diagonals are placed in a 64-bit integer (LV). The value for all right diagonals are placed in a second 64-bit integer (RV). Before each value is added into its correct integer, the integer is multiplied by 64, effectively shifting the integer by 5 bits to make room for a new value. The method allows for twelve right diagonals and twelve left diagonals. In most cases no symbol in any character set will have more than twelve diagonals of any one kind. When such an instance does arise, a second set of integers is used to accommodate the overflow.

The next step in the process depends on the type of operating mode. When operating in training mode, the character is added, along with the FV, EV, IV, LV and RV values into a relational database. Since this method of character recognition is not context sensitive, characters from more than one language can be loaded into the same database allowing for more than one language to be recognized from the same database. Databases can also be built to allow for optical character recognition of typed fonts and the like, as the principles underlying this invention are not limited to hand-written character recognition.

When operating in character recognition mode, we perform database searches to identify images (53). The database is queried using the FV, EV and IV values as keys. If there is a unique character that corresponds to all three keys, the character is returned as the interpretation of the unknown image. If more than one character is found to correspond to all three keys, a second query is made adding the LV and RV values to the key list. If there is a unique character that corresponds to all five keys, the character is returned. If no unique character is found, a symbol (usually a "?" but it can be any character) is returned to the user indicating the character is unknown.

If no character was found in response to the original three key query, a series of queries can be made to determine a "high probability" answer. The number of queries is determined by the user. The probability that a character will be found increases as more queries are made. However, the probability that the wrong character will be chosen also increases as more queries are made. The first set of queries are queries made with FV and EV as the keys. For each of these queries FV is modified to reflect the value it would have if one of the vertical lines was actually a diagonal or if one of the diagonal lines was actually a vertical. These substitutions are based on the fact that character slants vary from writer to writer. Therefore, a line that would be vertical in a perfectly formed character could actually appear as a diagonal and vice versa. During these queries, a count is kept of the number of times a particular character is matched to the search keys. At the end of the series of queries, if a character count is greater than all the other character counts by at least two then that character is returned. Otherwise the next series of queries is executed.

The next series begins with a query that only uses FV as the key. If only one character is returned from this query, that character is returned to the user. If more than one character is returned, each character is entered into a table. If no characters are returned from the query the table is left null. The next query uses only EV as the search key. If the table is null the characters that are found are entered into the table. If the table is not null, the characters in the table are compared to the characters returned from the query. If a character in the table is not in the query results, the character is erased from the table, i.e., a logical "AND" is performed using the characters in the table and the characters returned from the query. If only one character remains in the table at the end of the process, that character is returned.

If no character remains in the table, the "unknown character" symbol is returned. If more than one character remains in the table or if the return of the query was null, the next query is executed. The next query uses only IV as the search key. The previous process is then repeated for the results of this query. If no unique character is found the process is repeated using the following key combinations:

1. FV and IV
2. EV and IV
3. FV and EV

At this point if a unique character has not been found a query is made using FV and each table entry as search keys. The number of times each character from the table is in the database with the given FV value, is the results of the query. If the count for any character is greater than all the others by five then that character is returned.

The invention has now been explained with reference to specific embodiments. Other embodiments will be apparent to those of ordinary skill in the art. For example, while this invention has been disclosed in the context of recognizing characters, particularly hand-written characters, the inventive techniques may also find application in recognition of other patterns which have been reduced to pixels and which contain information to which keys may be directed. It is therefore not intended that this invention be limited, except as indicated by the appended claims.

What is claimed is:

1. A method for recognizing ciphers, said method comprising the steps of:

inputting a digital representation of a cipher, along with a bits-to-pixel ratio of said digital representation, the number of pixels per row of said digital representation, the number of rows in said digital representation, and an indicator which represents a block boundary condition of said digital representation;

transforming said digital representation so that each individual pixel of image information is represented by an addressable data block;

smoothing said transformation;

locating enclosures in said smoothed transformation, said enclosures defining spatial boundaries;

sizing said smoothed transformation, resulting in selected erased enclosures;

restoring all erased enclosures in said sized transformation;

normalizing said enclosure-restored transformation so that stray marks are erased, to form a normalized image;

thinning said normalized image;

storing said thinned image in a sparse space matrix;

locating significant features in said thinned image;

quantizing location of said significant features; and performing database searches using said quantized values as search keys to identify ciphers associated with said search keys.

2. A method for recognizing ciphers, said method comprising the steps of:

inputting a digital representation of a cipher, along with a bits to pixel ratio of said digital representation, the number of pixels per row of said digital representation, the number of rows in said digital representation, and an indicator which represents a block boundary condition of said digital representation;

transforming said digital representation so that one pixel of image information is represented by a block;

smoothing said transformation wherein said smoothing step comprises the steps of:
   testing the nearest eight neighbors of each "off" pixel;
   testing the nearest forty-eight neighbors of said "off" pixel if said nearest eight neighbors are all "on"; and
   turning said pixel on if any of the said nearest forty-eight neighbors are "off";

locating enclosures in said smoothed transformation, said enclosures defining spatial boundaries;

sizing said smoothed transformation, resulting in selected erased enclosures;

restoring all erased enclosures in said sized transformation;

normalizing said enclosure-restored transformation so that stray marks are erased, to form a normalized image;

thinning said normalized image;

storing said thinned image in a sparse space matrix;

locating significant features in said thinned image;

quantizing location of said significant features; and performing database searches using said quantized values as search keys to identify ciphers associated with said search keys.

3. The method of claim 1 wherein said locating enclosures step comprises the steps of:

locating a set of at least one pair of contiguous pixels which are off;

testing for a set of pixels which surround said off pixels and which are on; and recording locations of said off pixels.

4. The method of claim 1 wherein said sizing step comprises the steps of:

calculating a horizontal factor;

calculating a vertical factor; and calculating for each pixel in said smoothed transformation a new horizontal and vertical position based on said horizontal and vertical factors.

5. The method of claim 1 wherein said restoring step comprises:

calculating preferred locations of enclosures in the restored image;

testing said preferred locations to determine if the enclosures are present at said preferred locations; and restoring said enclosures if said enclosures are not present.

6. The method of claim 1 wherein said normalizing step comprises:

testing whether a subject pixel in the top row of said enclosure-restored transformation is on;

if said subject pixel is on, testing the nearest six bottom neighbor pixels; and turning said top row subject pixel on if all of said bottom six neighbor pixels are off.

7. The method of claim 1 wherein said normalizing step further comprises the steps of:

testing whether a subject pixel in the top row of said enclosure-restored transformation is off;

if said subject pixel is off, testing side pixels adjacent both sides of said subject pixel; and turning said subject pixel on if both said side pixels are on.

8. The method of claim 1 wherein said normalizing step further comprises the steps of:

testing whether a subject pixel in any row except the top row of said enclosure-restored transformation is on;

if said subject pixel is on, testing the nearest top six neighbor pixels; and turning said subject pixel off if all of the said nearest top six neighbor pixels are off.

9. The method of claim 1 wherein said normalizing step further comprises the steps of:

testing whether a subject pixel in the bottom row of said enclosure-restored transformation is off;

if said subject pixel is off, testing side pixels adjacent said subject pixel; and turning said subject pixel on if both said side pixels are on.

10. The method of claim 1 wherein said normalizing step further comprises the steps of:

testing whether a subject pixel in any row except the top or bottom row of said enclosure-restored transformation is on and is not in the first or last column of said enclosure-restored transformation;

if said subject pixel is on, testing the top six nearest neighbors and the bottom six nearest neighbors; and turning said subject pixel off if said top six nearest neighbors or said bottom six nearest neighbors are all off.

11. The method of claim 1 wherein said normalizing step further comprises the steps of:

testing whether a subject pixel is part of an enclosure;

if said pixel is not part of an enclosure, testing whether said subject pixel is off;

if said pixel is off, testing said pixels twelve nearest neighbors; and turning on said subject pixel, if all of the said twelve nearest neighbors are on.

12. The method of claim 1 wherein said normalizing step further comprises the steps of:

testing whether said subject pixel is on;

if said subject pixel is on, testing the nearest eight neighbors; and turning off said subject pixel if fewer than two of said nearest eight neighbors are on.

13. The method of claim 1 wherein said normalizing step further comprises the steps of:

testing for a blanking condition, said blanking condition being where a non-blank row in said enclosure-restored transformation is between two blank rows; and deleting said non-blank row and said two blank rows if said blanking condition is true.

14. The method of claim 1 wherein said normalizing step further comprises the steps of:

testing for gaps in the first row, the second row and the third row of said enclosure-restored transformation;

if said gaps exist and there is only one gap per row, computing the length of each gap; and filling in the gap in the first row if said gaps are directly above the succeeding gap and said lengths increase from top to bottom and the length of the top gap is less than five pixels.

15. The method of claim 1 wherein said normalizing step further comprises the steps of:

testing top row segment length of a top row segment in the top row;

if said top row segment length is less than five, testing next row segment length of the next row segment immediately below the top row segment in the top row; and if the top row segment length is greater than five and the next row segment is completely beneath the top row segment, then deleting the top row segment.

16. The method of claim 1 wherein said normalizing step further comprises the steps of:

testing bottom row segment length of a bottom row segment in the bottom row;

if said bottom row segment length is less than five, testing previous row segment length of the previous row segment immediately above the bottom row segment in the bottom row; and if the bottom row segment length is greater than five and the previous row segment is completely above the bottom row segment, deleting the bottom row segment.

17. The method of claim 1 wherein said thinning step comprises the steps of:

examining edges of the image, one edge at a time, for skeletal pixels; thereafter deleting pixels which are not skeletal;

repeating the process until only skeletal pixels remain; and reducing final skeletal image to fit into a uniform size matrix.

18. The method of claim 17 wherein said examining step comprises the steps of:

comparing each edge pixel and its eight nearest neighbors to a set of twelve patterns; and marking each said edge pixel as skeletal if said edge pixel and its eight nearest neighbors match any of said patterns.

19. The method of claim 17 wherein said examining step further comprises the steps of:

searching each row for a row segment longer then three pixels;

if a three-pixel row segment exists, examining pixels directly above and below said three-pixel row segment; and if the position of a three-pixel row segment is blank, marking all pixels in position of the three-pixel row segment as skeletal.

20. The method of claim 17 wherein said examining step further comprises the steps of:

examining vertical lines; and marking said vertical lines as skeletal if said vertical lines are longer than two rows and are less than three pixels wide.

21. The method of claim 1 wherein said locating step comprises the steps of:

computing an average length over all row segments in the image;

scanning for row segments which are greater in length than said average length;

for said row segments whose lengths are greater than average, scanning for row segment chains;

recording the location and length of said row segment chains;

determining type of line said row segment chains represent using fuzzy logic;

deleting said row segment chains from the image;

examining the remaining image for vertical lines;

determining whether said vertical lines are verticals or diagonals by using fuzzy logic;

recording the location, length and type of said lines;

erasing said lines from the image;

locating the remaining row segments;

recording the location of said row segments;

computing the locations of all intersect points;

recording said points;

computing the locations of all endpoints; and recording said points.

22. The method of claim 1 wherein said quantizing step comprises the steps of:
  assigning numeric values to each feature based upon x-y coordinate location of said each feature;
  totaling said numeric values for line types;
  totaling said numeric values for endpoints;
  totaling said numeric values for intersect points;
  totaling said numeric values for right diagonals; and
  totaling said numeric values for left diagonals.

23. The method of claim 1 further comprising the steps of:
  adding a known cipher and its quantized values to an relational database.

24. A method for recognizing ciphers, said method comprising the steps of;
  inputting a digital representation of a cipher, along with a bits to pixel ratio of said digital representation, the number of pixels per row of said digital representation, the number of rows in said digital representation, and an indicator which represents a block boundary condition of said digital representation;
  transforming said digital representation so that one pixel of image information is represented by a block;
  smoothing said transformation wherein said smoothing step comprises the steps of:
    testing adjacent neighbors of each "off" pixel;
    testing next nearest neighbors of said "off" pixel if said adjacent neighbors are all "on"; and
    turning said pixel on if any of the said next nearest neighbors are "off";
  locating enclosures in said smoothed transformation, said enclosures defining spatial boundaries;
  sizing said smoothed transformation, resulting in selected erased enclosures;
  restoring all erased enclosures in said sized transformation;
  normalizing said enclosure-restored transformation so that stray marks are erased, to form a normalized image;
  thinning said normalized image;
  storing said thinned image in a sparse space matrix;
  locating significant features in said thinned image;
  quantizing location of said significant features; and
  performing database searches using said quantized values as search keys to identify ciphers associated with said search keys.

* * * * *